United States Patent [19]
Tsuruta et al.

[11] Patent Number: 5,299,287
[45] Date of Patent: Mar. 29, 1994

[54] INFORMATION PROCESSING SYSTEM

[75] Inventors: Setsuo Tsuruta, Machida; Kiyomi Kishi, Kawasaki; Kuniaki Matsumoto, Tokyo; Shigenobu Yanai, Katsuta; Kiminori Nakamura, Machida, all of Japan

[73] Assignees: Hitachi, Ltd., Tokyo; Hitachi Control Systems, Inc., Hitachi; Hitachi Microcomputer Engineering Ltd., Kodaira, all of Japan

[21] Appl. No.: 839,072

[22] Filed: Feb. 21, 1992

Related U.S. Application Data

[63] Continuation of Ser. No. 759,771, Sep. 13, 1991, abandoned, which is a continuation of Ser. No. 357,170, May 26, 1989, abandoned.

[30] Foreign Application Priority Data

Jul. 1, 1988 [JP] Japan ................................ 63-162554

[51] Int. Cl.$^5$ .............................................. G06F 15/00
[52] U.S. Cl. ......................................... 395/51; 395/62
[58] Field of Search ............................. 395/51, 60, 62

[56] References Cited

PUBLICATIONS

The Structure of Instructional Knowledge: An Operational Model; Steven Evans; 1974; Instructional Science 2(1974)421-450.
The Total-System Design of Instruction: A Project Overview; Steven Evans; 1981; Creighton University; Omaha, Nebr.
A Simplified Problem Reduction Format; Plaisted; *Artificial Intelligence*; 18(1982) 227-261.
8th Inter. Workshop Expert Systems and their Applications; An expert system for portfolio management using both frames and production rules; Chan et al; pp. 463-481; 1988.
Smalltalk-80; The Language and its Implementation; Goldberg et al; 1983.
And/Or Schemes and Logic Programs; Colloquia Mathematica Societatis Janos Bolyai 42. Algebra, Combinatorics and Logics in Computer Science; 1983; Stepankova et al; pp. 765-776.
Global and Local control of Processing using Knowledged-based signal processing techniques; H. Broman; 1988 IEEE Int. Sym. on Circuits & Systems; Jun. 7-9, 1988; pp. 2375-2379.

*Primary Examiner*—Allen R. MacDonald
*Attorney, Agent, or Firm*—Antonelli, Terry, Stout & Kraus

[57] ABSTRACT

A problem solving system including apparatus for representing a relationship between a goal including subgoals and its lower level subgoals and for achieving the goal as a strategy of a first kind. Apparatus is provided for repetitively dividing a goal including subgoals into its lower level subgoals according to the relationship between the goal and the subgoals. A strategy of a second kind is used to specify the functions to be performed by the apparatus to achieve the lowest subgoal. Apparatus is also provided for simplifying and solving a complicated problem by executing the goal including subgoals by use of the strategies of the first and second kinds.

27 Claims, 23 Drawing Sheets

FIG. 5

SELECT-GOAL-TYPE

START

3000A: ASSIGN GOAL OBJECT OF THE UPPERMOST LEVEL (HAVING LEVEL SLOT VALUE OF 1) TO THE GOAL OF KERNEL OBJECT, ASSIGN I TO ITS GOAL LEVEL SLOT AND MAKE ITS STRATEGY EMPTY

3010A: PUSH STRATEGY OBJECT UPPERMOST IN PRIORITY AND HAVING NAME OF TOP OF GOAL (STACK) OF KERNEL OBJECT IN APPLICABLE GOAL SLOT VALUE TO STRATEGY (STACK) OF KERNEL OBJECT

- STRATEGY HAS SUBGOALS & SUBGOAL-TYPE → 3030A: INCREASE GOAL LEVEL OF KERNEL OBJECT BY ONE, SET RESULT IN LEVELS OF ALL ELEMENTS OF SUBGOAL (QUEUE) OF STRATEGY OBJECT, AND PUSH (ADD) ALL OF THESE ELEMENTS TO GOAL (STACK) OF KERNEL OBJECT
- NO SUBGOALS (EXECUTION TYPE) → 3020A: EXECUTE PROCEDURE SPECIFIED IN EXECUTION PROCEDURE
- SELECT-GOAL-TYPE → 3060A: EXECUTE PROCEDURE OF GOAL INQUIRY MENU INPUT TYPE; 3070A: PUSH MENU-SELECTED GOAL TO GOAL OF KERNEL OBJECT; 3080A: INCREASE GOAL LEVEL OF KERNEL OBJECT BY ONE AND SET RESULT IN LEVEL OF THE SELECTED GOAL

3040A: POP (DELETE) STRATEGY (STACK) AND GOAL (STACK) OF KERNEL OBJECT

- TOP GOAL OF GOAL STACK AFTER DELETION IS UPPER LEVEL GOAL OF AUTOMATIC TYPE, OR CONTENT SLOT OF DELETED GOAL IS TERMINATION AND TOP GOAL AFTER DELETION IS UPPER LEVEL GOAL OF SELECT-GOAL-TYPE → 3050A: DECREASE LEVEL SLOT VALUE OF KERNEL OBJECT BY ONE
- TOP GOAL AFTER DELETION IS IDENTICAL LEVEL OR UPPER LEVEL WHICH DOES NOT SATISFY CONDITION INDICATED ON RIGHT SIDE
- GOAL (STACK) AFTER POP IS EMPTY → END

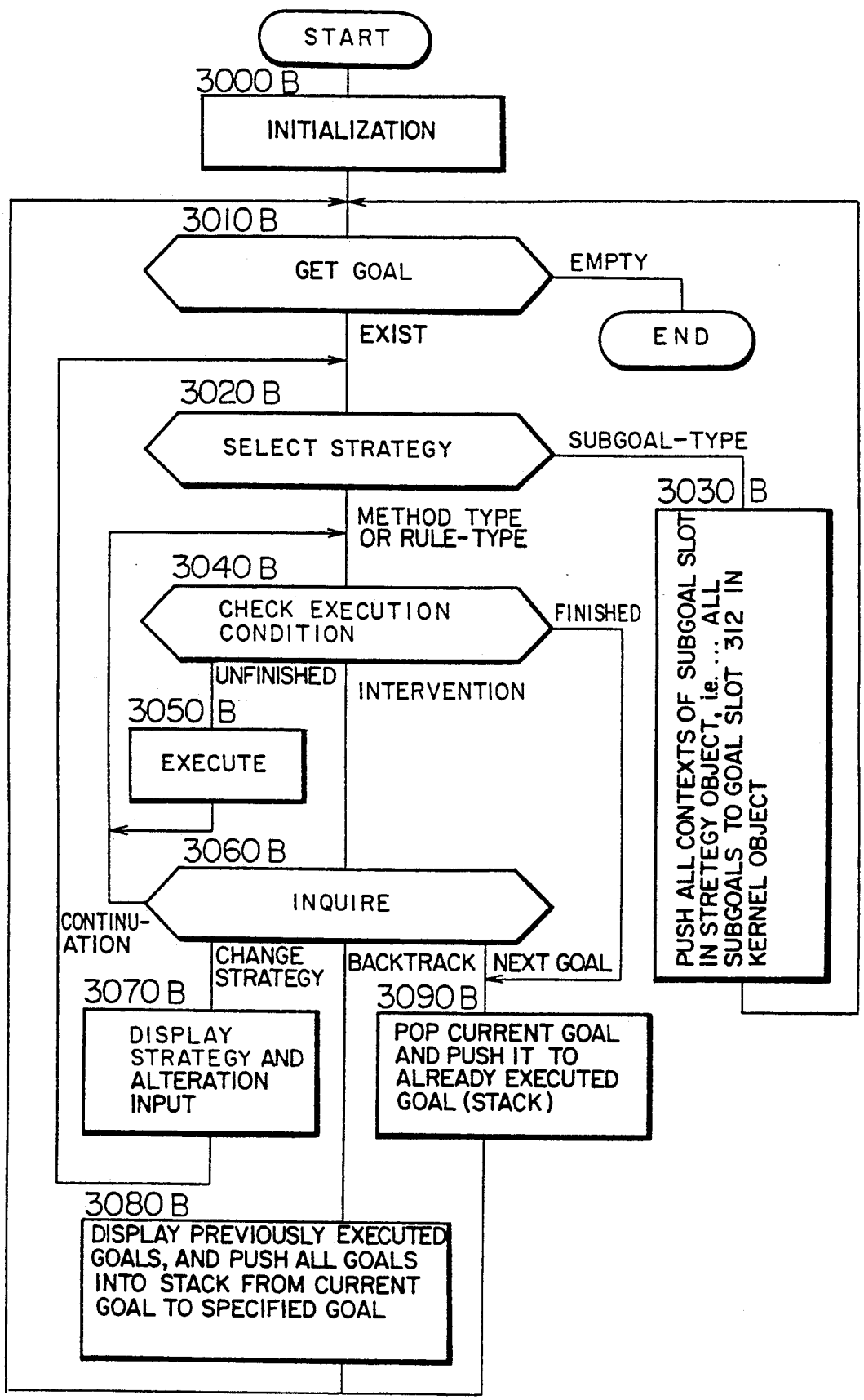

EXPERT ACTOR

APPEARING PERSON STACK

FIG. 15
GOAL STRATEGY TYPE COOPERATIVE KNOWLEDGE BASE
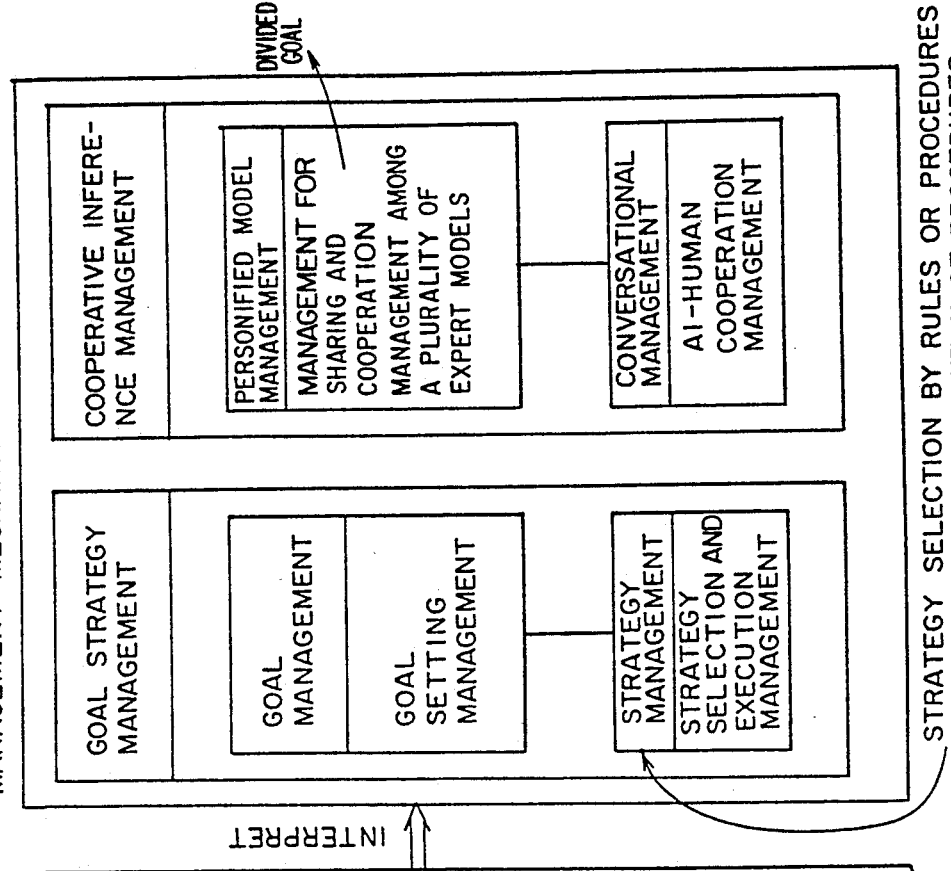
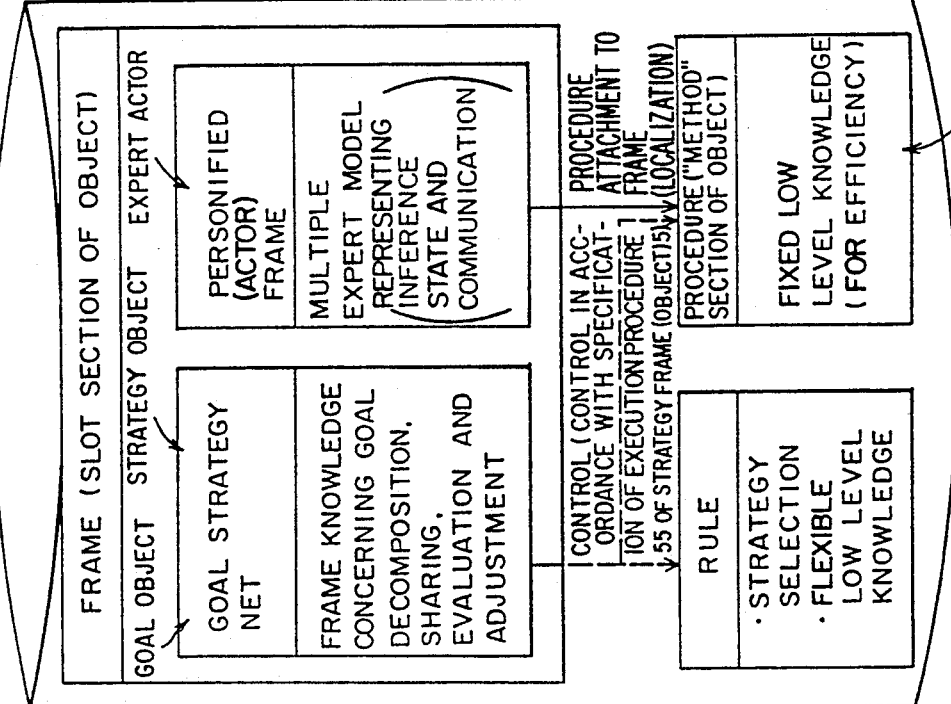

INFORMATION PROCESSING SYSTEM

This application is a continuation of application Ser. No. 759,771, filed on Sep. 13, 1991 now abandoned which is a continuation of application Ser. No. 357,170 filed May 26, 1989 now abandoned.

CROSS-REFERENCE TO RELATED APPLICATION

This application is related to U.S. patent application Ser. No. 832,892 filed Feb. 26, 1986 which was abandoned in favor of application Ser. No. 255,253, filed Oct. 11, 1983 which issued as U.S. Pat. No. 4,926,343 on May 15, 1990.

BACKGROUND OF THE INVENTION

The present invention relates to an information processing system, and specifically to a system for solving a problem through utilization of a knowledge information processing technique (i.e., an artificial intelligence technique) in order to simplify a complicated problem. In particular, the present invention relates to an information processing system suitable to make scheduling, such as a train scheduling system involving trainman scheduling, more intelligent.

The present invention is analogous to U.S. patent application Ser. No. 832, 892 in that a personified model manager is used. While the U.S. patent application Ser. No. 832,892 describes a method for cooperation among a plurality of actors (i.e., a plurality of expert programs which are personified programs simulating the intelligence of experts), the present invention relates to a system for flexibly solving complex problems through goal decomposition that can be embodied even by only a single actor or embodied by multiple actors also.

As disclosed in U.S. Pat. No. 4,648,044, it is hitherto known that knowledge is represented as rules, called production rules, and inference is executed through interpreting the production rules. However, this shows nothing but an inference section (block 13 of FIG. 1) of the present invention and, both basis procedures for achieving goals and adjustment procedures for adjusting the unsatisfactory results are represented as rules. In a complicated problem such as train scheduling including trainman scheduling the number of rules becomes enormous and these rules become entangled (interact or interfere) with each other. This causes problems in processing speed and in reliability.

SUMMARY OF THE INVENTION

The prior art has such problems that in the case where a system becomes complex and the number of its functions increases, the number of rules enormously increases and the interaction among the rules increases exponentially in such a case, and therefor proper responce and reliability of a system suffers.

The basic object of the present invention is to fix the above-mentioned problems of the prior art without losing the adaptability of the rule-based system, or, in other words, to improve the artificial intelligence technique applicable to solving complex planning problems such as transit scheduling which mostly involves crew scheduling.

A first object of the present invention is to provide a system capable of coping with complicated problems rapidly and having highly reliable adjustment functions in order to solve problems, and in particular to put into practical use an artificial intelligent technique of scheduling such as trainman scheduling.

A second object of the present invention is to realize an interactive information processing system for man-machine cooperative inference. In this system policy-level knowledge called "strategy" is described for enabling a user to select an inference goal of a computer. In the course of inference by the computer, the system recognizes interruptions from a user and inputs the user's directives and then continues computer inference or resumes at the beginning of the goal achieving process after changing the goal or inference strategy of the computer.

A third object of the present invention is to provide a rapid, highly reliable system allowing a plurality of personified programs simulating the intelligence of experts to communicate with each other and perform cooperative inference in order to solve problems, and in particulary to make an artificial intelligence technique applicable to very complex scheduling problems such as trainman scheduling.

The basic object of the present invention can be attained by providing a kernel knowledge section to manage the knowledge for goal decomposition and cooperation in order to make complex problems into more simple subproblems. More concretely, this kernel knowledge can comprise an object and rules, capable of solving the problems on the basis of the basic inference section or basic inference engine by representing a lot of complex knowledge as objects and rules where such complex knowledge is structured by a hierarchical network (FIG. 11) called a "goal-strategy-network" whose nodes represent goals or strategies to achieve a goal by repetitively decomposing it into subgoals, direct execution of subgoals and cooperative adjustment between subgoals, whose arcs connect a goal and its decomposition strategy and subgoals generated by the decomposition, or connect a goal, though usually a subgoal, and a strategy to directly achieve the goal. Rules represent knowledge to adaptively select the optimal strategy.

The above described first object is achieved by providing an object, which is referred to as a "strategy" object and which describes the goal to be achieved policy or means for decomposing or directly achieving the goal, with a section (adjustment slot) specifying means for adjusting the result of performing a strategy and an adjustment method section for setting the strategy execution result for checking the result and, if necessary, performing the adjusting means specified as described above.

The above described second object is achieved by providing means for checking if a user's intervention occurred during automatic execution of the strategy and the above automatic adjustment and means for checking if both the strategy and the adjustment failed to accomplish its goal, means for asking and fetching user's inputs when user's intervention or the failure occurred and means for interpreting user's inputs, executing processing, and then continuing to perform the same strategy again or resuming other strategies or goals after changing them. Further, the above described second objective is achieved by enabling menu selection of strategies and goals, and memorizing the result as the change of the value of slots in the strategy "object".

The above described third object is achieved by providing an object (actor) 3 (in FIG. 1, FIG. 6, FIG. 8, FIG. 6A, FIG. FIG. 9A) having a section-memorizing the present goal 312 (in FIG. 6A, FIG. 9A) and strategy 314 processed by an individual expert actor 6 (in FIG. 1, FIG. 6, FIG. 8) and evaluation information 315 (in FIG. 6A) of the strategy execution result and having procedures called "methods" 321 (in FIG. 6A) for the strategy execution, a strategy "object" capable of representing an actor corresponding to an expert having responsibility to perform the strategy, and a kernel knowledge section having a memory section for making an actor specified in the strategy object of the performed strategy perform the strategy By using all means mentioned above, experts' knowledge for solving a complex problem by situational and adaptive decomposition is represented by a "frame" ("object") network called "goal-strategy-net". The kernel knowledge section mentioned above intercepts "goal-strategy-net" by traversing its nodes and automatically decomposes a goal (namely a given problem) into subgoals, a subgoal into subsubgoals recursively. The kernel knowledge section also situationally selects strategies for a goal by knowledge represented as "rules" mentioned before. After recursively decomposing a goal, if an indivisible goal is encountered, a strategy for direct execution is selected for the goal, which is directly executed by the strategy.

The result of the strategy execution is shown in a display window. If the result is not satisfiable and the adjustment "method" (procedure) name is specified in the adjustment slot of the strategy "object", the adjustment procedure is evoked, and if the adjustment fails, alternative adjustment procedure is selected from the alternative procedures name existing in the queue and the alternative adjustment is tried. Once the result of strategy execution is not satisfied, adjustments can be done one after another independently of the strategy execution. Therefore, it is possible to provide easily extendable adjustment facility. Unlike selection of adjustment "methods" (procedures) by matching many irrelevant rules, suitable adjustment "methods" (procedures) can be directly accessed. Therefore, the problem of processing speed and reliability lower can be solved.

BRIEF DESCRIPTION OF THE DRAWINGS

FIGS. 3 and 5, 7 and 10 are flow charts of knowledge processing performed by a kernel rule section of a kernel knowledge section in the first, second and third embodiments respectively shown in FIGS. 1, 6 and 8, respectively.

FIG. 15 shows a cooperative inference scheme of goal strategy type.

DETAILED DESCRIPTION OF THE PREFERRED EMBODIMENTS

An embodiment of the present invention will now be described by referring to drawings.

Figure 1:
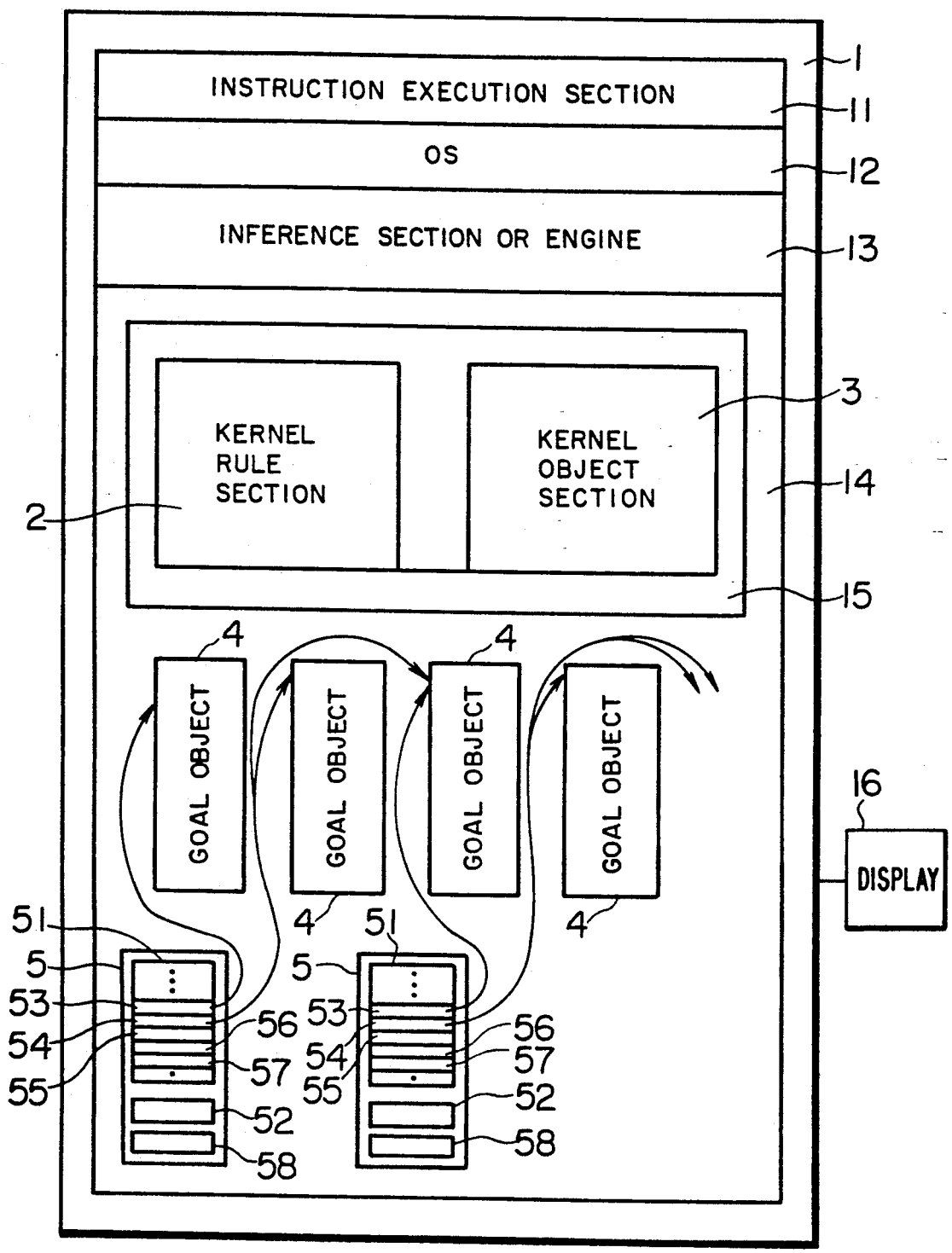
FIGS. 1, 6 and 8 are entire configuration diagrams of first, second and third embodiments of an information processing system according to the present invention, respectively.

FIG. 1 is an entire configuration diagram of a system according to the present invention.

Numeral 1 denotes a computer connected to a display 16, 11 an exectuion section of instructions described by means of a machine language of the computer, 12 an OS (operating system) for supporting the operation and resource allocation of a computer system, 13 an inference section or engine, and 14 a knowledge section. The inference section 13 interprets rules and objects of the knowledge section 14 to perform knowledge information processing, so called "inference" or "machine inference", through using the OS 12 and the instruction execution section 11. In the present invention, "object" means a package of data and programs which can share or inherit an attribute of an upper level class (so called "inheritance"). This is disclosed in "A. Goldberg, and D. Robson, "Smalltalk-80, The Language and its Implementation", Addison Vesley, 1983". That is programs and data having a common attribute or, programs sharing data with each other or accessing the same data can be packaged together using an "object". Therefore, use of an "object" makes programs easy to modify to produce modular software with high readability and expendability. Therefore, reliability and flexibility of the system is improved. However, if these effects are not expected, even through a package of data and programs which does not have the above mentioned function called "inheritance" or even if such a package is not used, all of the first to third embodiments of the present invention can be implemented if only data (referred to as "slot" or "slot value" in the above mentioned literature) and programs and referred to as "methods", "procedures" or "attached procedures" in the above mentioned literature) are provided. In all of the first to third embodiments of the present invention, however, the above mentioned "object" having high readability is used as a representative example to make the explanation more understandable.

Further, since a "frame" can be regarded as a package of data in parts of storage called "slot" and programs called "attached procedures", embodiments of the present invention can be implemented if "frame" is used instead of "object". Therefore, embodiments will hereafter be described by using "object" alone. Details of "frame" are described in the following literature.

(1) Bobrow, D. and Stefik, M." The LOOPS Manual, Knowledge-Based VLSI Design Group Memo KB VLSI 81-13, Xerox PARC (1982). (2) Minsky, M." A Framework for Representing Knowledge, in Winston). (ed.). The Psychology of Computer Vision, pp. 211-277, McGraw-Hill, New York (1975). As for "passing" (i.e., message communication by means of messages) and "methods" used in embodiments of the present invention, please refer to the above described literature relating to "object" and the literature (2) as for "frame". As for "production rule", "rule" or "production system" as well, please refer to the above described literature (1).

The knowledge section 14 comprises a kernel knowledge section 15, a goal object 4, and a strategy object 5 of the present invention. The kernel knowledge section 15 of the present invention comprises a kernel rule section 2 represented as rules and a kernel object (section) 3 represented as objects.

However, the kernel rule section can be implemented by means of a conventional program which is not rules, although the software readability, modifiability or expendability may be decreased. As already described, the object of the kernel object section can also be replaced with programs and data, or replaced with a "frame". This holds true in other embodiments of the present invention as well.

The strategy object 5 comprises a strategy object slot section 51 and a strategy object method section 52. The strategy object slot section 51 comprises an applicable goal slot 53 which is a memory part to register or remember applicable goals, a lower level goal slot 54 which is a memory part or a queue to register subgoals, an execution procedure slot 55 which is a memory part to register an procedure for a goal attainment, a strategy type slot 56 which is a memory part to register the type of a strategy represented by a strategy object 5, and an adjustment slot 57 which is a memory part to register a name of a procedure for the adjustment of the unprefered results.

Figure 2A:
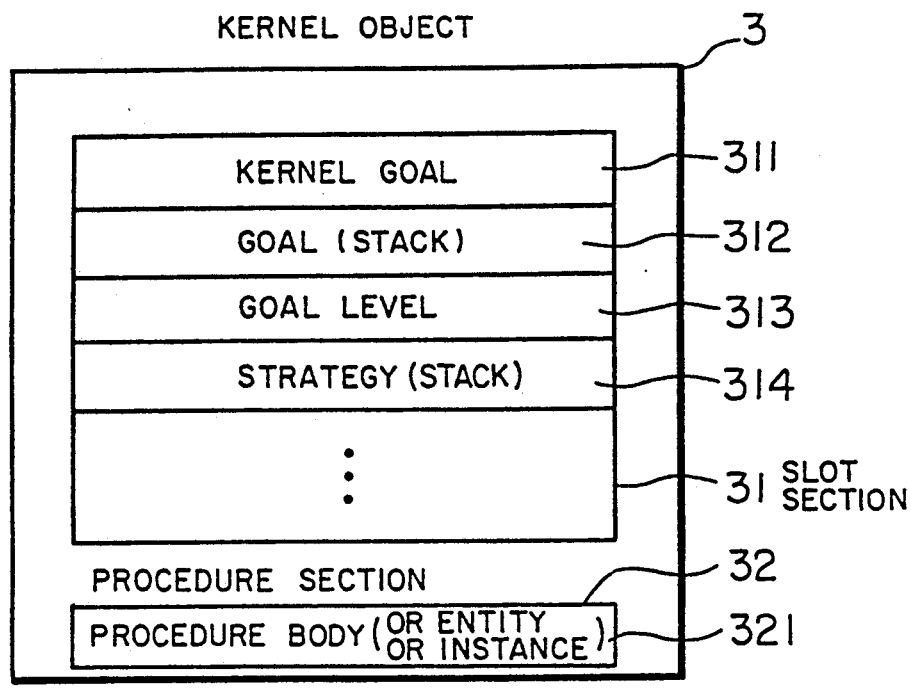
FIGS. 2A to 2C, 6A to 6D, and 9A to 9E are more concrete configuration diagrams of kernel objects and strategy objects used in the first, second and third embodiments respectively shown in FIGS. 1, 6 and 8, respectively.
Figure 2B:
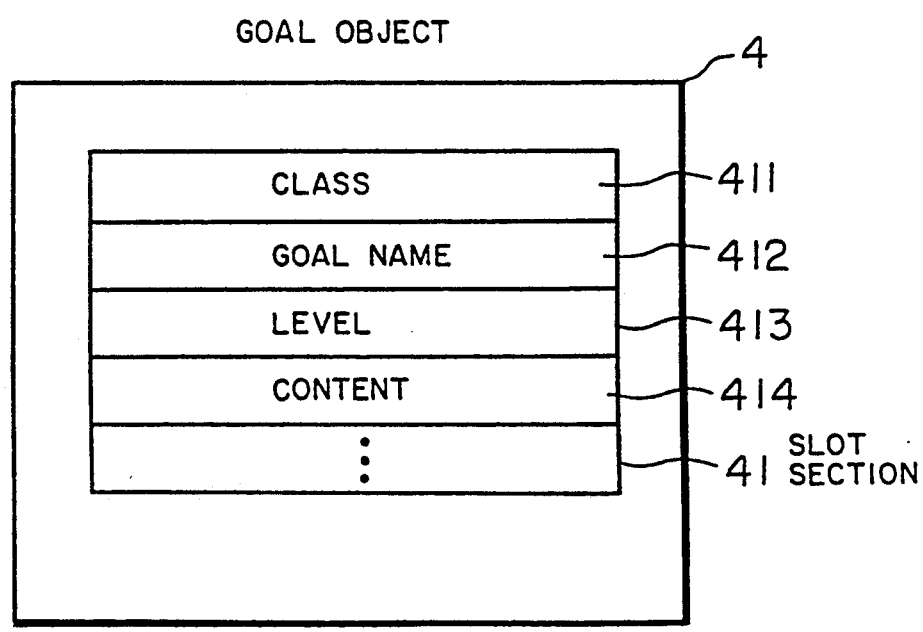
Figure 2C:
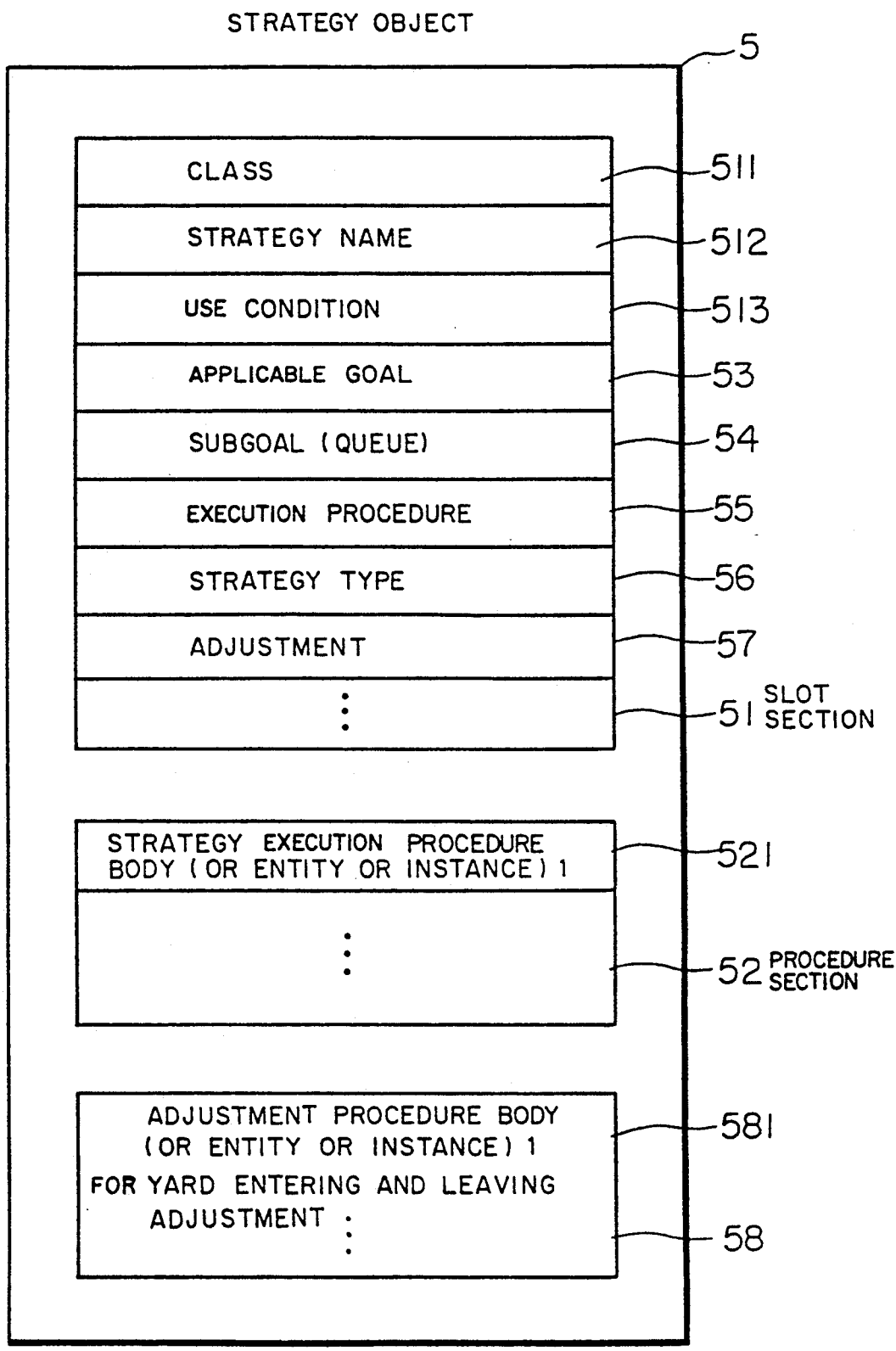

FIGS. 2A, 2B and 2C show configuration of the kernel object, the goal object and the strategy object, respectively. They show portions relating to the present embodiment more concretely.

Numeral 3 denotes a kernel object and numeral 31 denotes a slot section of the kernel object 3. The slot section 31 of the kernel object comprises a kernel goal slot 311, a goal slot 312, a goal level slot 313 and a strategy slot 314. Here, the word "slot" is occasionally abbreviated later. The goal (slot) 312 is a stack for remembering a list of goals to attain. (The term "stack" refers to a first in last out memory.) The goal level 313 remembers the level of the goal currently processed. The strategy (slot) 314 is a stack for remembering strategies selected to attain each goal stored in the goal (slot) 312. A method section or a procedure section 32 is the area for storing an execution procedure attached to the kernel object 3, i.e., an area for storing a procedure body 321.

Numeral 4 denotes a "goal" object or, strictly speaking, an instance of a "goal" object, and numeral 41 denotes a slot section of the goal object. The slot section 41 of the goal object comprises a class slot 411, a goal name slot 412 and a level slot 413. Here, the word "slot" is occasionally abbreviated later. The value of the class 411 is "goal" which means that the present object 4 has or inherits the attribute of "goal". In the goal name 412, the name of the present object 4, namely the (instance of a) goal object 4, is stored. In a content (slot) 414, the content of the goal is stored. (The default value is not determined initially.) The level (slot) 413 indicates the level of the goal object 4, and its default value is 0 (not determined). However, only one object with the highest (uppermost) level (1) is prepared from the beginning.

Numeral 5 denotes a strategy object, and numeral 51 denotes its slot section. The slot section 51 of the strategy object comprises a class 511, a strategy name 512, a use condition 513, an applicable goal 53, a subgoal (queue) 54, an execution procedure 55, a strategy type 56 and an adjustment 57.

The value of the class 511 is "strategy". The strategy name 512 indicates the name of a strategy represented by the present object. The use condition (slot) 513 has, as its value, the priority in applying the present strategy (object). The applicable goal (slot) 53 has, as its value, a slot of "goals" whereto a strategy represented by the present object 5 can be applied. The subgoal 54 is a queue storing subgoals in the order to be attained. Here these subgoals are used by the present strategy 5 as means for achieving a goal. The execution procedure 55 is a slot whose value is the name of an execution procedure for directly executing a goal which cannot be further decomposed into subgoals. The procedure body or entity or instance of the execution procedure is represented as an method (procedure) such as a strategy execution procedure body (or entity or instance) 1 (521) in a strategy object method section 52 of the strategy object 5. In case the strategy type 56 is a decomposition type (or later mentioned "subgoal-type"), the goal is decomposed into its subgoals 54. In case the strategy type 56 is a "execution type", herein below called a "method -type", the goal is not decomposed but directly executed. The adjustment 57 is a slot whose value is the name of a procedure for adjusting the strategy execution result if problems are detected (strategy execution failed) or the result is unprefered. The body (or entity or instance) of adjustment procedure is represented as a method (procedure) such as an adjustment execution procedure body (or entity or instance) 1 (518) in an adjustment method section 58 of the strategy object 5.

Figure 3:
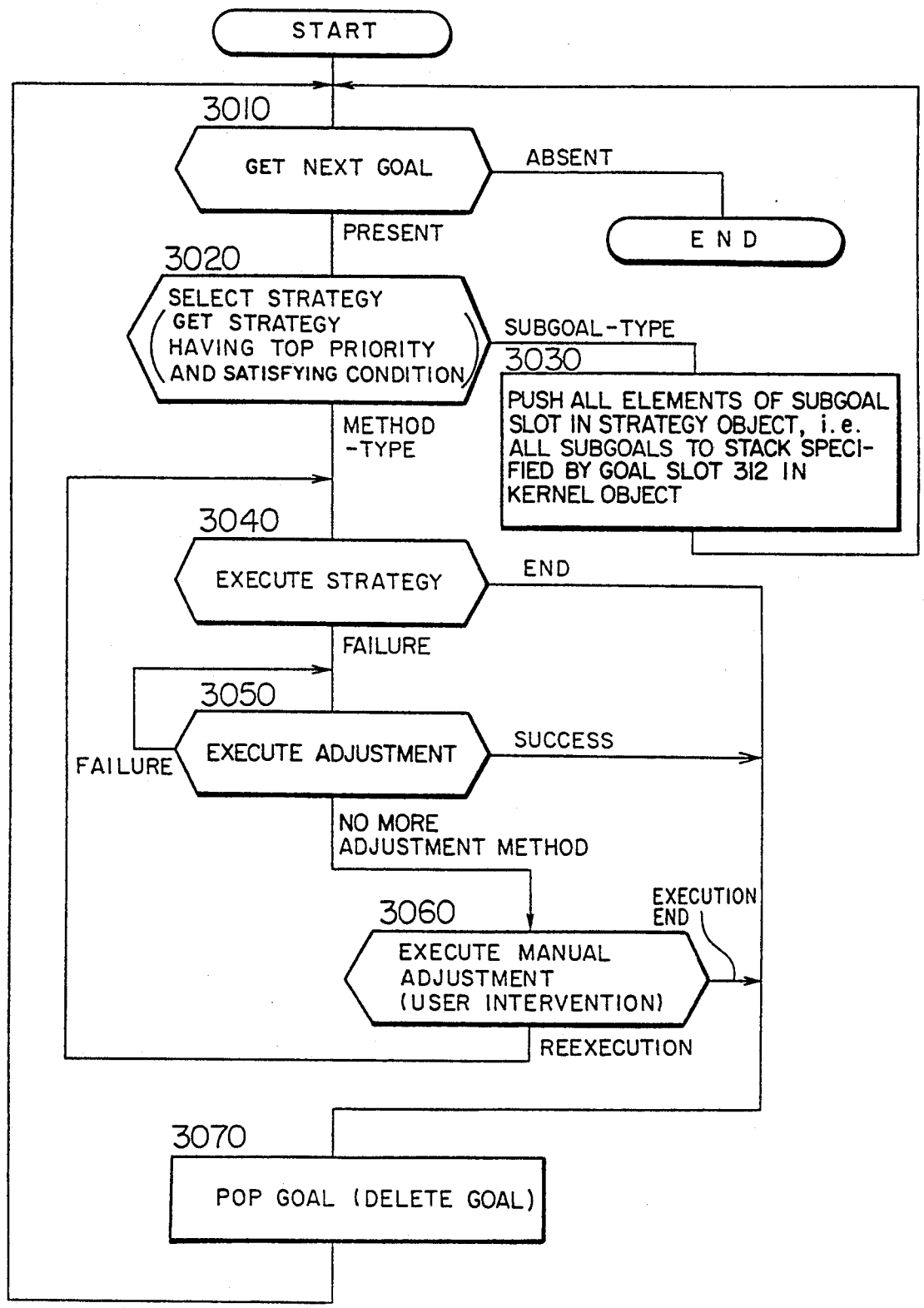

FIG. 3 is a flowchart of a knowledge information processing of the kernel rule section 2.

The next goal is read in block 3010. That is to say, a goal is popped from the top of a goal stack, namely in the goal 312 of the kernel object 3 as the next goal to the executed. If the stack is empty, the processing is finished.

In block 3020, strategy selection is done. That is to say, if a goal whose name is equivalent to the value of the goal name slot 412 of the next goal popped in the block 3010 exists in the applicable goal (queue) 53 of the strategy object 5, the strategy object having the highest priority where such a priority, is described as the value of the use condition slot 513, is selected, and pushed into the stack, namely, the strategy slot 314 (FIG. 2A) of the kernel object 3.

In block 3030, all the lower level goals, namely subgoals of the goal to be achieved are fetched from subgoal slot 54 in the above selected strategy object 5. The top of the goal 312 (slot whose data-type is a stack) of the kernel object 3, is substituted for a list of the above fetched lower level goals, namely, elements of the subgoal 54 in the above selected strategy object 5 without changing the order, i.e., so that the top element of the subgoal 54 (queue) may be the top of the goal 312 (stack), and the second element of the subgoal 54 may be the second of the goal (stack) 312 and so on.

In the block 3040, the selected strategy of method type or direct-execution type is directly executed through invocation of the procedure whose name is the value of the execution procedure 55 of the selected strategy object 5.

In case the execution of strategy results in failure, adjustment is done in block 3050 through invoking the procedure whose name is registered in the adjustment slot 57 of the above selected strategy object 5 until the adjustment results in success or all procedures queued in the adjustment slot 57 (queue) are used up.

If any adjustment procedures are not queued in the adjustment slot 57 of the strategy object 5, or as a result of strategy execution all of adjustment procedures queued and registered in the adjustment slot 57 are used up, or adjustment is forced to stop by user intervention, manual adjustment is done in block 3060.

When the execution ended or the adjustment resulted in success or ended, the name of the goal composed in the execution is popped (removed at top) from the goal 312 (stack) of kernel object 3 in block 3070.

Figure 4:
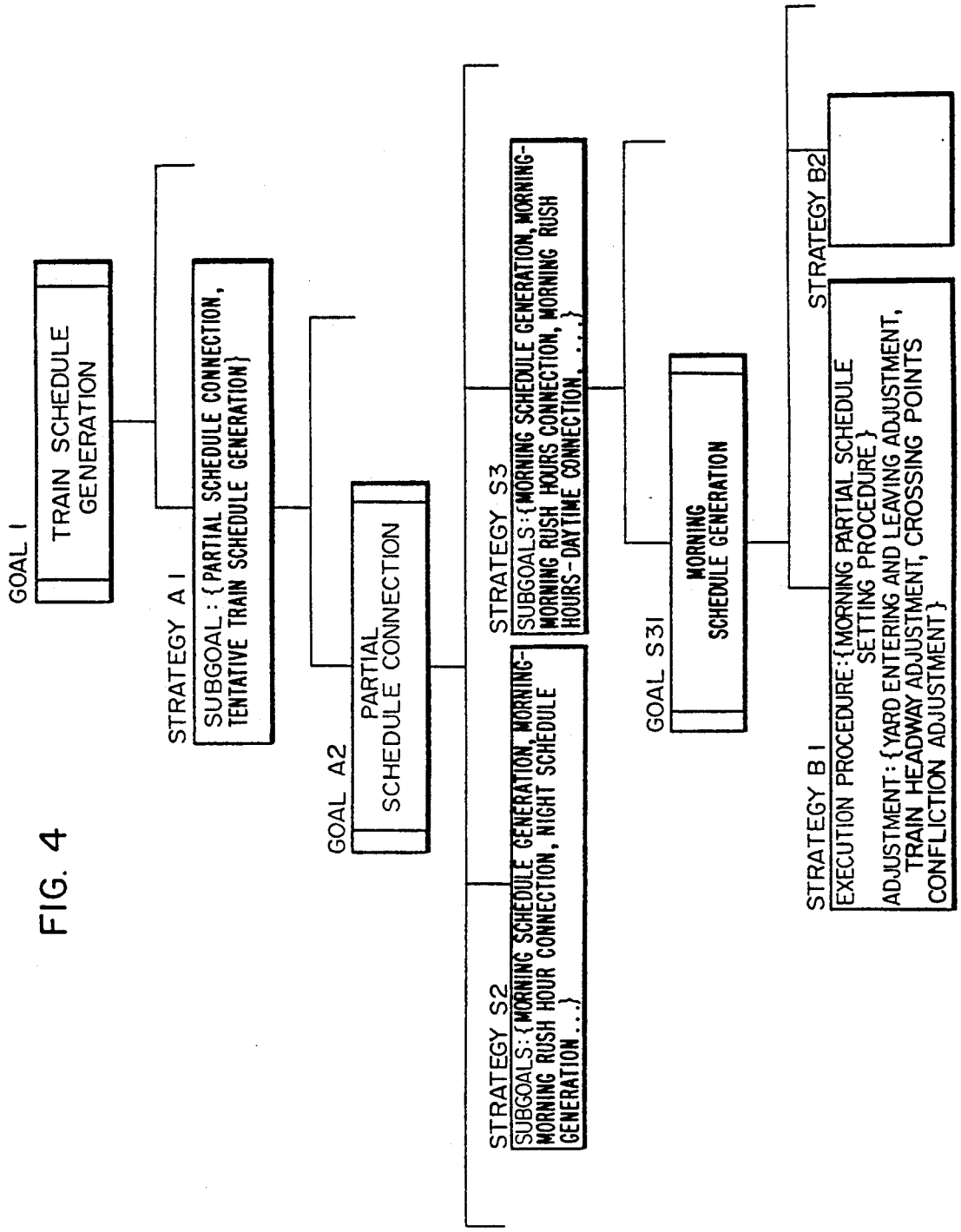
FIGS. 4 and 11 show examples of schedule generation to concretely explain the operation of the embodiments of FIGS. 1 and 8 by using examples of schedule generation, respectively.

As for FIG. 4, one day is divided into five periods such as "morning, "morning rush hours", "daytime", "evening rush hours"and "night" according to the difference in the number of dispatched trains per hour. Partial schedules are generated for respective periods. The partial schedules thus generated are connected together to generate a schedule for one day (called a tentative train schedule). An embodiment of such generation of a train schedule according to the present invention will now be described concretely by using simplified knowledge configuration of train scheduling goal and strategy represented by "goal-strategy-net" in FIG. 4 as an example.

FIG. 4 is a part of a simplified description computer interpretable knowledge hierarchy of goal and strategy called "goal-strategy-net" used in generation of an above described simple train schedule. The top level goal is train schedule generation (goal 1 "object"). As one of decomposition policies for achieving this goal, strategy A1 "object" having a subgoal (queue) 54 slot whose values are two lower level goals (namely subgoals) represented as (partial schedule connection and tentative train schedule generation) is considered. Decomposition policies for achieving the (sub) goal of "partial schedule connection" (goal A2 "object"), strategy "object" S2, having a subgoal (queue) 54 slot whose values are lower level goals (namely subgoals) for decomposing the subgoal A2 into further lower level subgoals, represented as {morning generation, morning-morning rush hours connection, night generation, and so on}, and a strategy "object" S3 having a subgoal 54 whose values are the lower level goals namely subgoals represented as {morning generation, morning-morning rush hours connection, morning rush hours-daytime connection, ... and so on}, are considered. Decomposition policies for achieving the morning generation goal (goal S31), two strategies represented by strategy B1 "object" and strategy B2 "object" are also considered.

Flow of processing will now be described along the flow chart of FIG. 3 where "object" is usually abbreviated from a goal "object" or a strategy "object".

It is now assumed that the morning generation goal is popped as the next goal in the block 3010. It is further assumed that the strategy B1 is selected in the block 3020 in order to achieve the morning generation goal. If B1 is strategy of execution type (namely, method-type), the strategy is directly executed in block 3040, and a "morning partial schedule setting procedure" set in a slot of the strategy B1 "object" as the execution procedure 55 is executed.

If the execution of the "morning partial schedule setting procedure" results in failure, the top of the adjustment procedures queued in a slot of the strategy "object" 5 is popped, and adjustment (block 3050) is executed by invoking the popped adjustment procedure. Assuming now that "yard entering and leaving adjustment" is specified as an adjustment execution procedure, the adjustment execution procedure main body 1 (581) corresponding to the yard entering and leaving adjustment incorporated in the adjustment method section 58 is executed. If the adjustment fails, other procedures like "train headway adjustment" and "intersection points adjustment" are popped from the adjustment slot 57 and executed. If the adjustment is successful, the strategy execution is finished. In this example, the morning generation goal is popped (i.e., deleted) (block 3070). If the queue of adjustment procedures, namely, a value of the adjustment slot of the strategy "object" is empty, manual adjustment (block 3060) is requested to be executed.

When lower level goals (subgoals) are developed in the present embodiment, the top of the goal queue 312 in the kernel object 3 is substituted with a row of goals (subgoals) represented by values of the low level goal (subgoal) 54 of the strategy "object" 5 for development. As an alternative, the high level goal stored at the top of the goal (queue) 312 in the kernel "object" 3 is not deleted when the low level goals (subgoals) are developed, and the developed row of goals is added to the top. In this alternative, the high level goal is deleted when all of the low level goals (subgoals) are achieved. As compared with this alternative method, the present embodiment brings about an effect that processing becomes simple and rapid because high level goals processing is simple.

Figure 6:
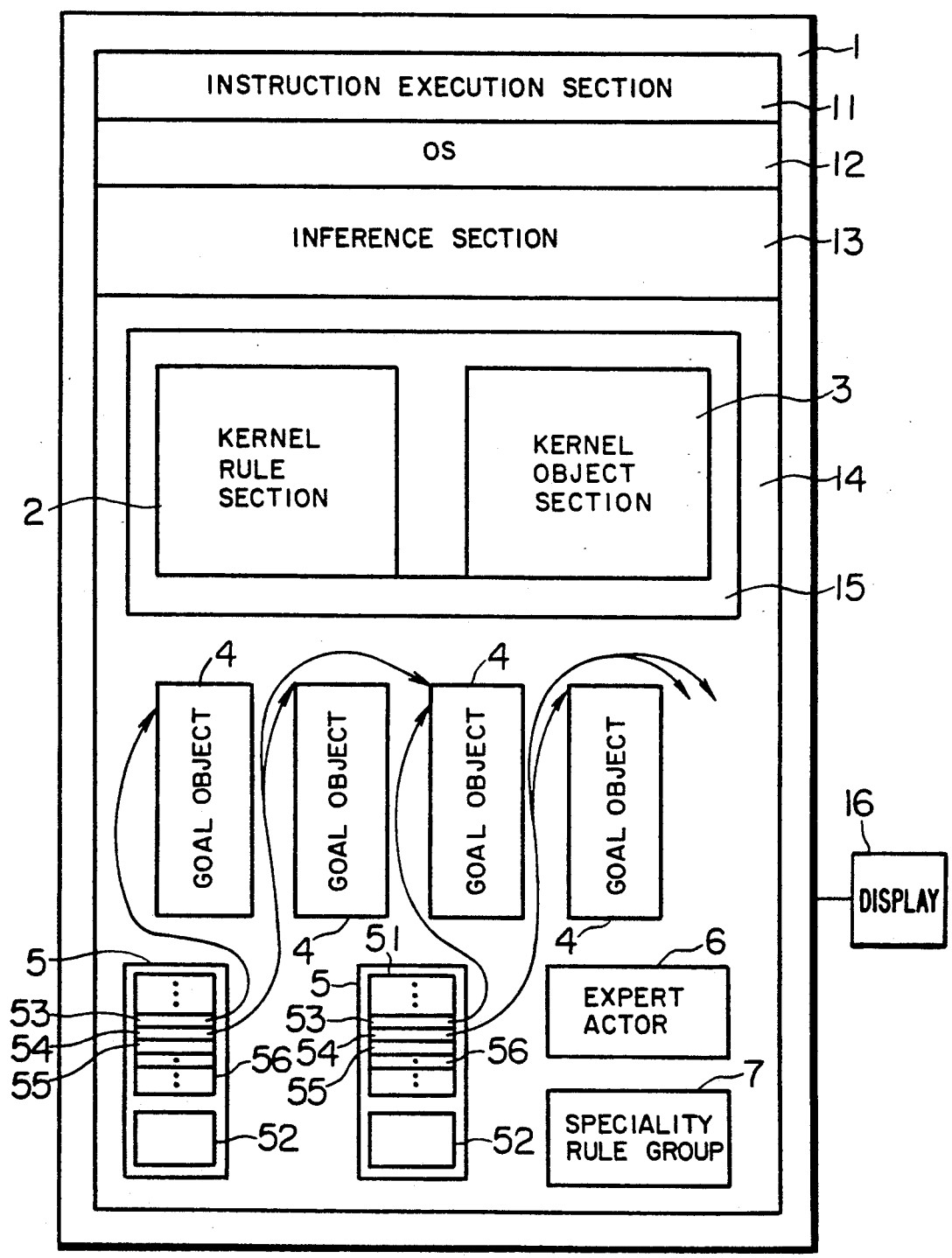
Figure 6A:
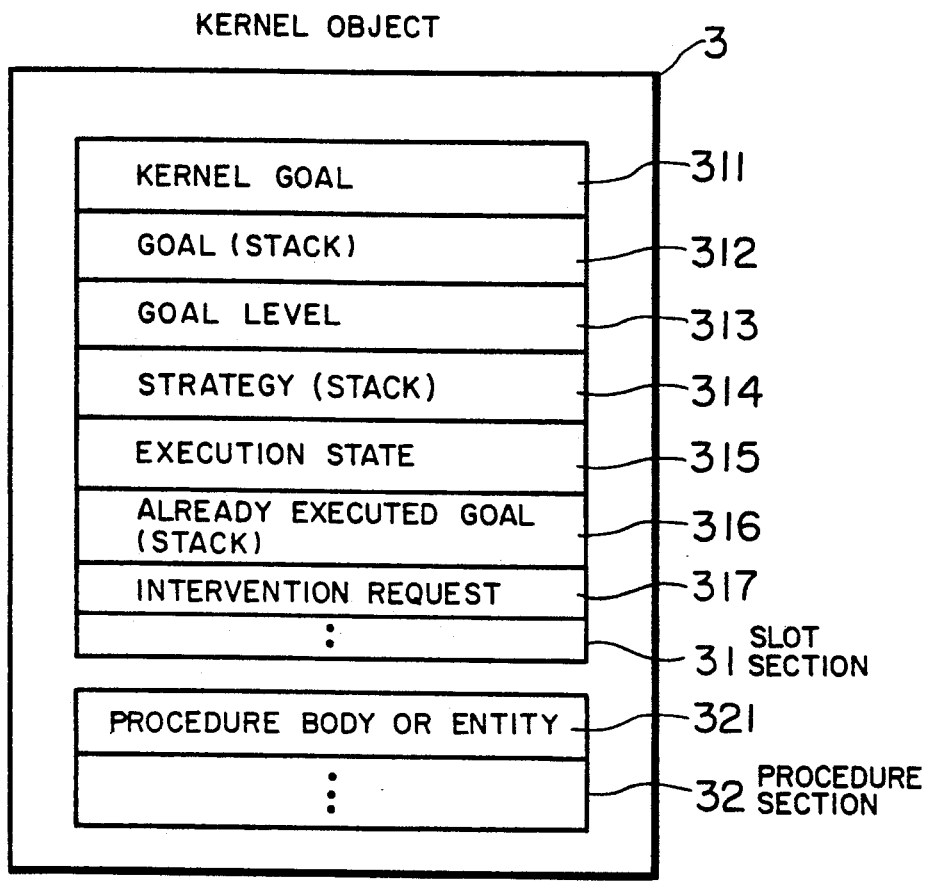

FIG. 6 is an entire configuration diagram of another embodiment (an embodiment 2) of a system according to the present invention. The embodiment of FIG. 6 differs from the embodiment of FIG. 1 in that a block 6 (expert actor) and a block 7 are provided. The expert actor 6 is an object representing the knowledge and inference state possessed by an expert. The block 7 is a specialty rule group representing specialty knowledge by rules.

FIGS. 6A, 6B, 6C and 6D show configuration of portions relating to the embodiment of FIG. 6, i.e., configuration of the kernel object 3, the goal object 4, the strategy object 5 and the expert actor 6 more concretely, respectively.

Numeral 3 denotes a kernel object, and numeral 31 denotes a slot section of the kernel object 3. The slot section 31 comprises a kernel goal slot 311, a goal slot 312, a goal level slot 313 and a strategy slot 314. The goal (slot) 312 is a stack for preserving a row of goals to be achieved. (The stack is a first in last out memory.) The goal level 313 memorizes the level of a goal now being processed. The strategy slot 314 is a stack for preserving a strategies selected to achieve respective goals contained in the goal slot 312. An intervention request 317 is set when user's intervention (interrupt) is sensed. The intervention request 317 is taken out by a procedure corresponding to a check operator 57 (FIG. 6C) described later and released concurrently therewith. The setting of the intervention request 317 (FIG. 6A) is performed by a procedure main body such as 321 of FIG. 6A included in a procedure section 32 of the kernel object 3.

Figure 6B:
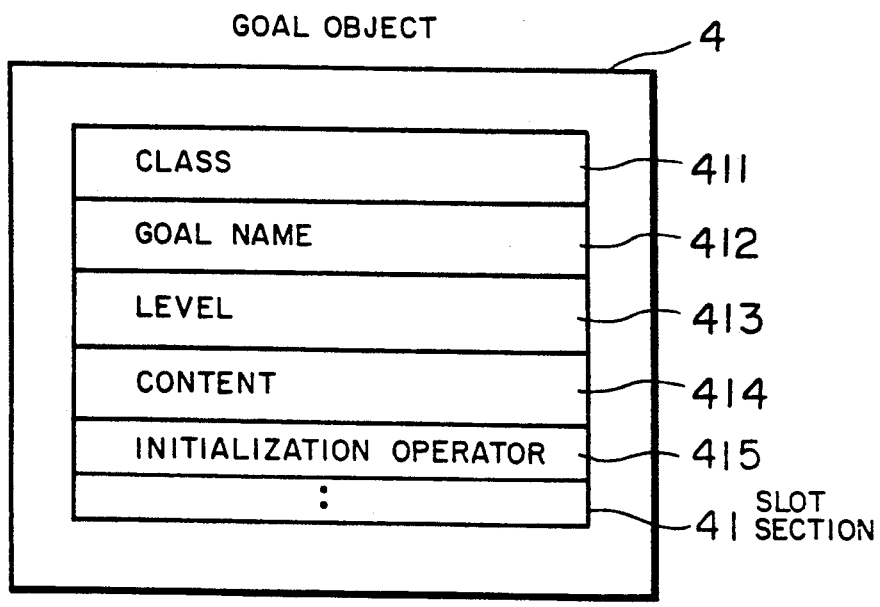
Figure 6C:
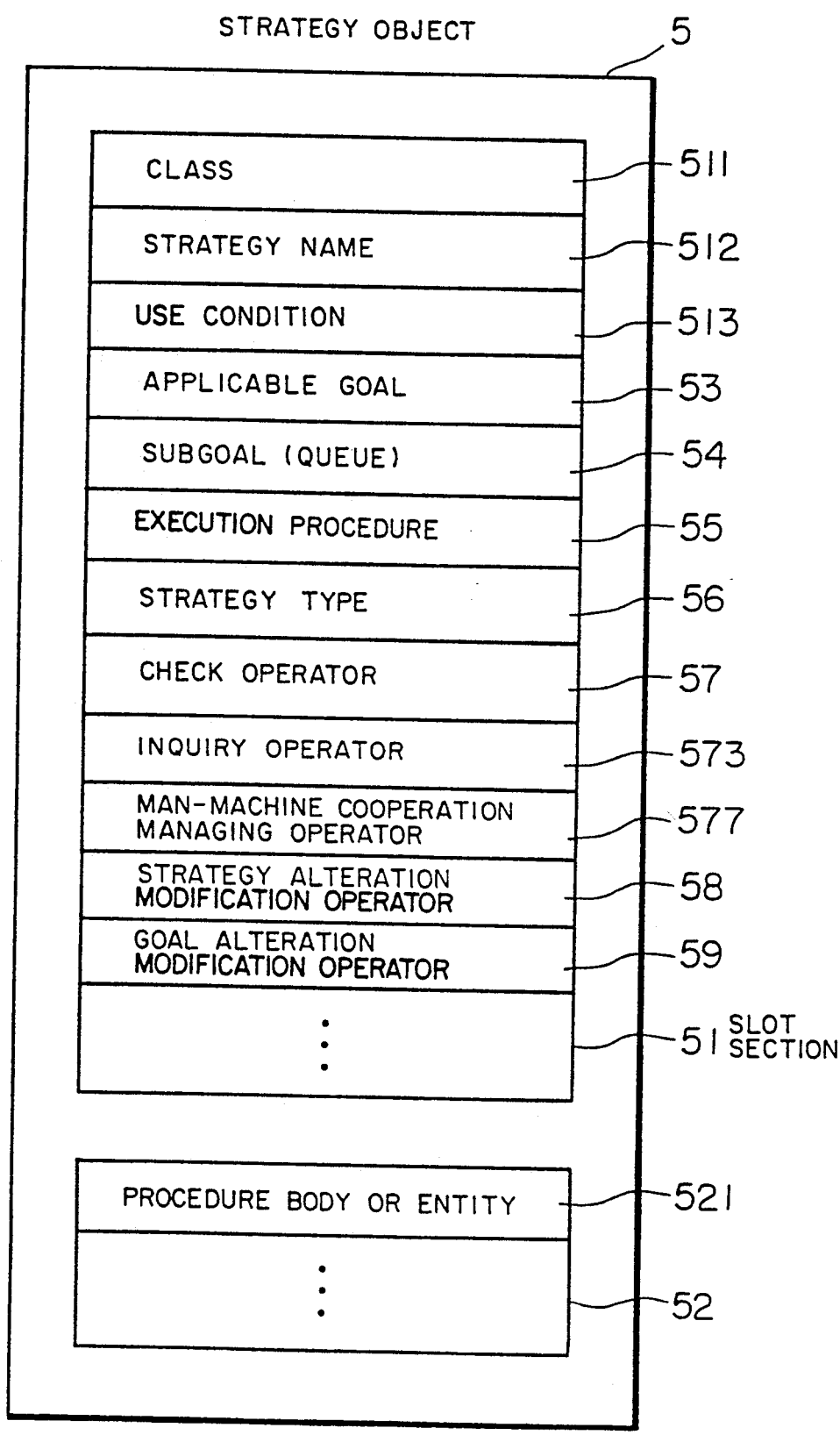
Figure 6D:
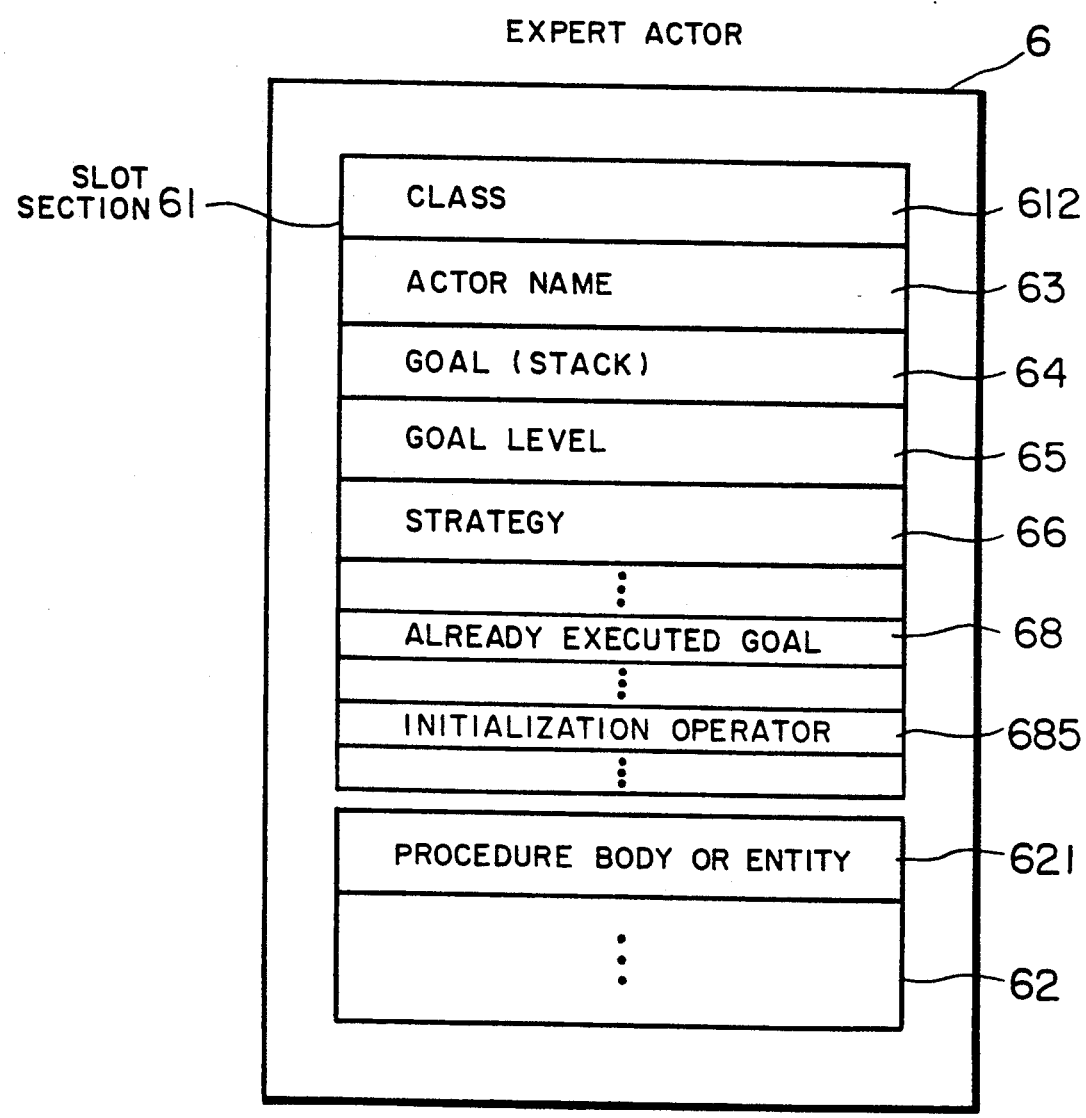

As for the goal object 4 and the strategy object 5, FIGS. 6B, 6C are almost the same as FIGS. 2B, 2C and are not described here.

An example of the second embodiment of the present invention (an embodiment of conversational-type) will now be described by referring to FIGS. 5, 6 and 6A to 6D. In this example, the user can select the next goal in a conversational-select-goal fashion. In the strategy type slot 56 of the strategy object 5 shown in FIG. 6C, therefore, "conversational type" ("conversational-select-goal-type") can be set. In the strategy of this type, the next goal is inquired of the user. Further, a procedure (such as the procedure main body 621 of the expert actor 6 shown in FIG. 6D) specified by the execution procedure 55 of the strategy of this type issues an input request for inquiring the next goal of the user and returns the input result as a return value (such as "0" in the top goal an d"1" in the next goal) corresponding to the order of the low level goal described in the low level goal 54.

FIG. 5 is a knowledge processing flow of the kernel rule section 2 shown in FIG. 6.

when the present system is started, the value of the kernel goal 311 of the kernel object 3 is "initialized".

In block 3000A, initial processing is performed. That is to say, if the kernel goal 311 of the kernel object 3 shown in FIG. 6 is "initialized", the goal name 412 of an object of the highest level having the value of the goal level 413 equivalent to 1 is pushed (added) the goal 312 of the kernel object 3. The goal level 313 is set at 1, and the strategy 314 is set to be empty", whereas the kernel goal 311 is set at "strategy selection". In block 3010, strategy selection processing is performed. That is to say, if the kernel goal 311 of the kernel object is "strategy selection" and the top of the goal 312 is a high level (i.e., the level 413 is smaller than the goal level 313), the goal level is decreased by one and the kernel goal 311 is set at "strategy performance". If, instead, the kernel goal 311 of the kernel object is "strategy selection", and objects "having the class 511 set at "strategy" and having the applicable goal 53 equivalent to (the top value of) the goal 312 of the kernel object 3 exist, the strategy name 512 of one of such objects having the largest priority described in the use condition 513 is pushed (added) to the strategy 314 of the kernel object 3, and the kernel goal 311 is set at "strategy performance".

In block 3020A, "execution processing" of a strategy which does not have low level goals is performed. That is to say, if the kernel goal 311 of the kernel object 3 is "strategy performance" and the low level goal 54 of the strategy object 5 having the strategy name 512 equivalent to (the top value of) the strategy 314 is "empty", the procedure (such as 521) within the method 52 specified in the performance procedure 55 is executed, and the kernel goal of the kernel object 3 is set at "procedure execution post-processing".

In block 3030A, performance processing of a strategy of automatic type having low level goals is performed. That is to say, if the kernel goal 311 of the kernel object 3 is "strategy performance", the low level goal 54 of the strategy object 5 having the strategy name 512 equivalent to (the top value of) the strategy 314 is not empty, and its strategy type 56 is other than "conversational-type", the value of the goal level 313 of the kernel object 3 is then increased by one and the resultant value is set into the level 413 of the goal object 4 of all elements of the low level goal (queue) 54 described later. In addition, all of these elements are added to the top of the goal (stack) 312 without changing the order (i.e., so that the top element of the subgoals queue may become the top element of the goal stack), and the kernel goal 311 is set at "strategy performance".

In block 3040A, post processing after the procedure execution such as deletion of the already executed goal is performed. That is to say, if the kernel goal 311 of the kernel object 3 is "procedure execution post-processing", the strategy (stack) 314 of the kernel object 3 and the goal (stack) 312 are popped (deleted at the top). If, at this time, the level 413 of the goal object 4 of the top element of the goal 312 obtained after deletion is the same level (i.e., the same value) as the goal level 313 of the kernel object 3, or the following condition is not satisfied, the kernel goal 311 is set at "strategy selection". The above described condition means that the processing is finished provided that the goal 312 after deletion is empty. IF the level 413 of the goal object 4 of the goal 312 after deletion has a higher level (i.e., smaller value) than the goal level 313 of the kernel object 3 and the strategy type 56 of the strategy object 5 of the strategy (stack) 314 after deletion is other than the conversational-type, or if the level 413 has a higher level in the same way as the foregoing description, the above described strategy type 56 is conversational-type, and the content 414 of the deleted goal is "finished", then the value of the goal level slot 313 is decreased by one, and the kernel goal is not altered (block 3050A).

Blocks 3060A to 3080A form center of the processing of the kernel rule performing the strategy performance processing of conversational-type. That is to say, if the kernel goal 311 of the kernel object 3 is "strategy performance" and the strategy type 56 of the strategy object 5 having the strategy name 512 equivalent to (the tope value of) the strategy 314 is "conversational-type", the procedure specified in its execution procedure 55 (such as the procedure 521 within the method 52) is executed. As described at the beginning of the present embodiment relating to the conversational-type, the procedure 521 displays a menu for goal selection inquiry together with other information required for goal selection judgment with by a, and returns the goal selected by the user as a return code corresponding to the order of elements of the low level row described in the low level goal 54 of the strategy object 5. (for example, return code) 0 represents the top goal of the low level row, and return code 1 represents the next goal.) In block 3070A, an element of the low level goal row (of the low level goal 54) corresponding to the order represented by the return code is taken out as the selected goal and pushed to the kernel goal 311 of the kernel object 3. Subsequently in 3080A, the goal level of each object is increased by one and set in the level 413 of the selected goal object 4 as described above. And the kernel goal 311 is set to be "strategy selection".

A second example of the embodiment 2 represented by the entire configuration diagram of FIG. 6 will now be described by referring to FIGS. 6, 6A to 6D, and 7. The second example of the embodiment 2 is an embodiment of information processing of man-machine cooperation manager type which allows the user's intervention in the course of strategy execution and allows the user to change the strategy and move the goal back in a man-machine cooperation manager fashion. The performance procedure 55 of the strategy object 5 indicates the name of (execution) means for directly performing a goal which cannot be further developed into low level goals. This execution means is described as individually methods 521 as in the strategy performance procedure main body 1 of the method section 52 contained in the strategy object 5, a procedure main body 621 of a method section 62 of the expert actor 6, or symbols corresponding to the expert rule group 7.

For the purpose of information processing of man-machine cooperation manager type, the strategy object 5 also comprises, in its slot section 51, a check operator 57 describing means for checking user's intervention and defect occurrence in performing the strategy, an inquiry operator 573 describing means for addressing and inquiry to the user upon occurrence of intervention or a defect and inputting a user's directive, a man-machine cooperation managing operator 577 describing means for executing manual processing, a strategy alteration operator 58 describing strategy alteration means, and a goal alternation operator 59 describing goal alteration means. Their bodies (or entities or instances) are described as method such as the procedure body (or entities or instances) 321 of the method section 32 of the kernel object 3 or described by rules of the kernel rule section 2.

FIG. 7 is a knowledge processing flow chart of the kernel rule section 2 in the second example of the embodiment 2.

When the system of the present embodiment is started, the kernel goal 311 of the kernel object 3 indicates "initialization".

First of all, initial processing is performed (block 3000B). That is to say, if the kernel goal 311 of the kernel object 3 is in the initialized state, the goal name 412 of an object of the uppermost level having a value "1" of the level 413 is pushed (added) to the goal 312 of the kernel object 3, and the goal level 313 is set at "1". And the strategy 314 is set at "empty", and the kernel goal 311 is set at "goal readout".

In block 3010B, goal readout processing is performed. That is to say, if the kernel goal 311 of the kernel object 3 is "goal readout" and the goal (stack) 312 is empty, processing of the present system is finished. Unless the goal (stack) is empty, the kernel goal 311 is set at "strategy selection".

In the block 3020B, strategy selection processing is done. That is to say, the kernel goal 311 of the kernel object 3 is "strategy selection" and the top of the goal 312 is higher level (i.e., the level 413 has a smaller value than that of the goal level 313), the value of the goal level is decreased by one, and the kernel goal 311 is set at "strategy performance". If, instead, the kernel goal 311 of the kernel object 3 is "strategy selection" and objects having "strategy" in class 522 and having applicable goal 53 equivalent to (the top value of) the goal 312 of the kernel object 3 exist, the strategy name 512 of the strategy 5 of an object included in such objects and having the uppermost priority described in the use condition 513 is pushed into the strategy 314 of the kernel object 3, and the kernel goal 311 is set at "strategy performance".

In block 3030B, performance processing of a strategy of development type having low level goals is performed. That is to say, if the kernel goal 311 of the kernel object 3 is "strategy performance", the subgoal 54 of the strategy object 5 having the strategy name 512 equivalent to (the top value of) the strategy 314 is not empty whereas its strategy type 56 is development type, the value of the goal level 313 of the kernel object 3 is increased by one and set into the level 413 of the goal object 4 of all elements of the subgoal 54 (queue) described below. In addition, all of these elements are added to the top of the goal (stack) 312 of the kernel object 3 without changing their orders, and the kernel goal 311 is set at "strategy selection".

In block 3040B, the execution condition for execution processing of a strategy which does not have low level goals is checked. That is to say, if the kernel goal 311 of the kernel object 3 is "strategy performance", checking is performed by the check operator 57 specified by the strategy object 5. For check results such as "unfinished", "finished", and "occurrence of intervention request or defect", the kernel goal 311 is set at "inference continuance". "processing after execution" and "inquiry (upon occurrence of intervention request or defect)", respectively.

If the kernel goal 311 of the kernel object 3 is "inference continuance" and the strategy type 56 of the strategy object 5 indicated by the strategy 314 of the kernel object 3 is procedure-execution-type, the procedure specified in its execution procedure 55 is executed in block 3050B. If the strategy type 56 is "rule-execution-type", at least one rule group corresponding to the name specified in its execution procedure 55 is executed in order defined in correspondence to the name. Thereafter, the kernel goal 311 of the kernel object 3 is set at "strategy performance".

In block 3060B, inquiries are addressed to the user. That is to say, if the kernel goal 311 of the kernel object 3 is "inquiry", inquiries are addressed to the user by using the inquiry operator 573 of the strategy object 5 indicated by the strategy 314 of the kernel object 3, and the result of inquiry is inputted. For inquiry results such as "continuance", "strategy alternation", "return" and "next goal", the kernel goal 311 is set to be "strategy execution", "strategy alternation", "backtracking", and "processing after execution", respectively. Further, the execution state is set to be "finished" for the next goal and set to be "unfinished" for other goals.

In block 3070B, selection display-selection input processing is performed. That is to say, names of all strategy objects having the goal indicated in the goal 312 as the value of the applicable goal 53 are displayed as menu by the strategy alteration operator 58 of the strategy object 5 indicated by the strategy 314. A strategy object manually selected or automatically selected out of these strategy objects is pushed into the strategy 314 of the kernel object 3, and the kernel goal 311 is set at "strategy selection".

In block 3080B, processing relating to backtracking is performed. That is to say, if the kernel goal 311 of the kernel object 3 is "backtracking" the content of an already executed goal (stack) 316 is displayed as menu by the goal alteration operator 59 of the strategy object 5 indicated by the strategy 314. Up to a goal specified by the user with respect to this menu, elements of goals already executed are popped and pushed (added) to the goal 312. At this time, initialization processing directed in a initialization operator 415 of the goal object 4 pushed push by push is performed. Here, it is also permitted to specify an expert (for example, by displaying a row of expert who have appeared), pop all goals performed by the expert (i.e., the already executed goal 68 of the expert actor) from the already executed goal 316 of the kernel object 3, push the goals into the goal 312, and perform backtracking. At this time, it is also permitted to perform initialization processing at a time by using the initialization operator 685 of the expert actor without using initialization operators of respective goal. After the goal level 313 has been set at the level 413 of the goal object 4 of the above described goal directed by the user, the kernel goal 311 is set to be "goal readout".

In block 3090B, postprocessing after execution of the procedure such as deletion of executed goals. That is to say, if the kernel goal 311 of the kernel object 3 is "processing after execution of procedure", the goal (stack) 312 of the kernel object 3 undergoes popping (deletion at the top), and the top of the strategy 314 is also popped concurrently therewith. The goal thus deleted is then pushed to (i.e., added to the top of) the already executed goal 316, and the kernel goal 311 is set at "goal read". If the level 413 of the goal object 4 located at the top of the goal 312 which has undergone deletion is higher than (i.e., smaller in value than) the goal level 313 of the kernel object 3, however, the goal 312 is popped (i.e., deleted at the top) again, and the top of the strategy 314 is also popped concurrently therewith. The popped goal is then pushed to the already executed goal 316. After the goal level 313 has been reduced by one, the kernel goal 311 is set at "goal read".

Figure 8:
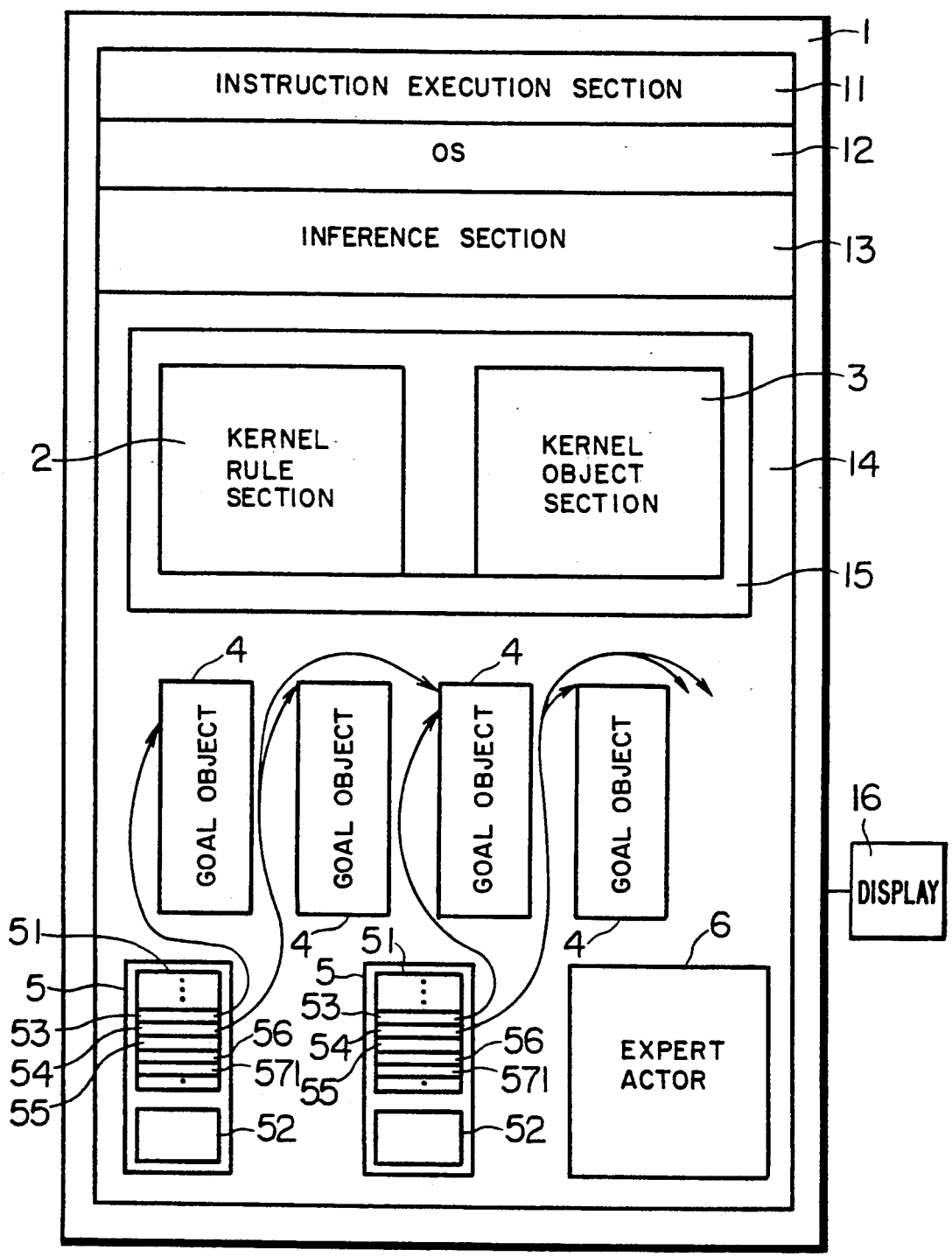

FIG. 8 is an entire configuration diagram of still another embodiment of a system according to the present invention. (Embodiment 3)

The present embodiment differs from the embodiment shown in FIG. 1 in that an expert actor 6 and a responsible person slot 571 for performing or executing strategy are provided.

FIGS. 9A to 9E respectively show a kernel object 3, a goal object 4, a strategy object 5, an expert actor 6 and an appearing person stack 7 (or performer stack) in the embodiment of FIG. 8.

The difference between the configuration shown in FIGS. 9A through 9E and that shown in FIGS. 2A through 2C, is as follows.

The kernel object 3 includes a present (or current) actor slot 315 having a stack for remembering persons responsible for performing or executing the strategy (i.e., the appearing person or performer stack 7) as a value. The strategy object 5 includes a responsible person (slot) 571 whose value is the name of a person responsible for performing or executing the strategy. Its procedure body (or entity of instance) is represented as an method (procedure) such as a strategy performing or executing procedure body (or entity or instance) 1 of a method section 52 included in the strategy object 5. In the same way as in the second embodiment described before, a performing (or execution) procedure of a conversational-select-goal-type abbreviated as "select-goal-type" type of strategy, displays a picture with subgoal selection menus asking a user to select a subgoal, and a return code for a selected subgoal is returned through using the table of the execution procedure which relates the order of the above each mouse with the order of each subgoal in the subgoal slot 54 (queue).

Figure 9A:
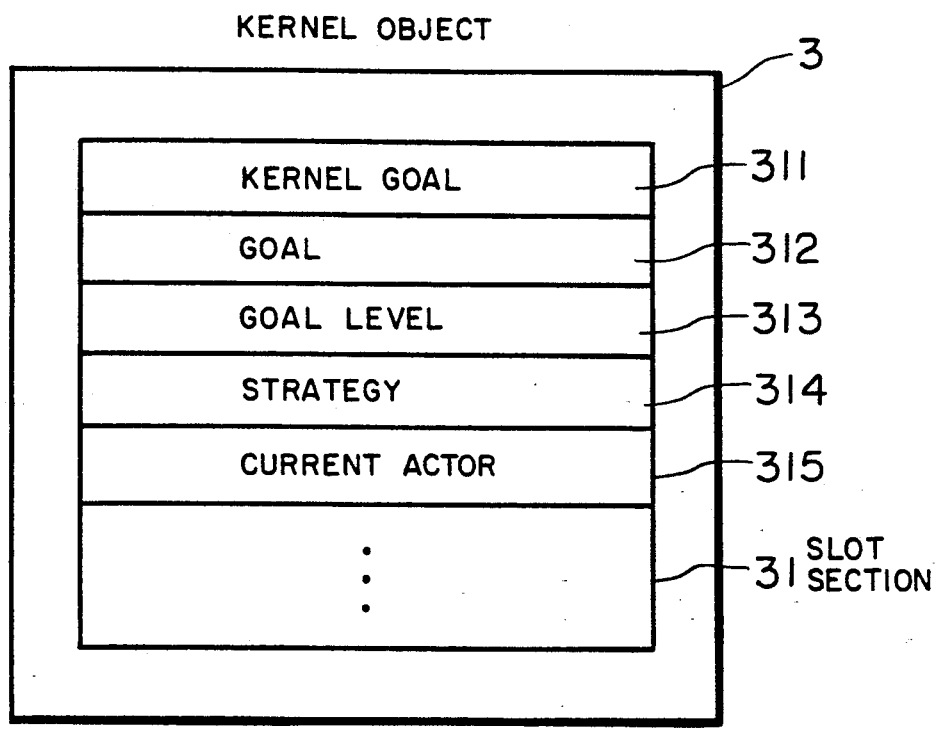
Figure 9B:
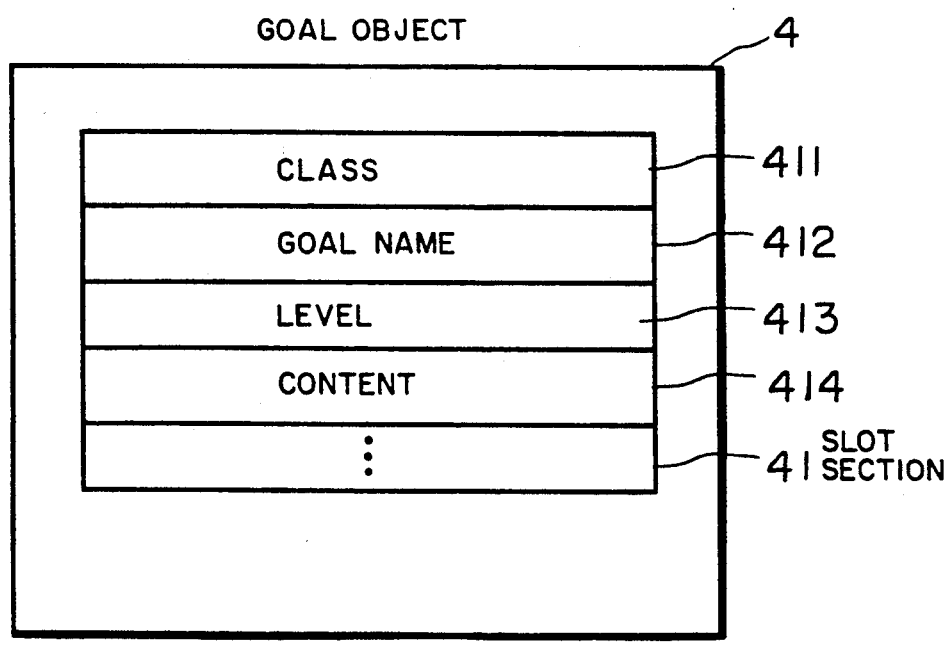
Figure 9C:
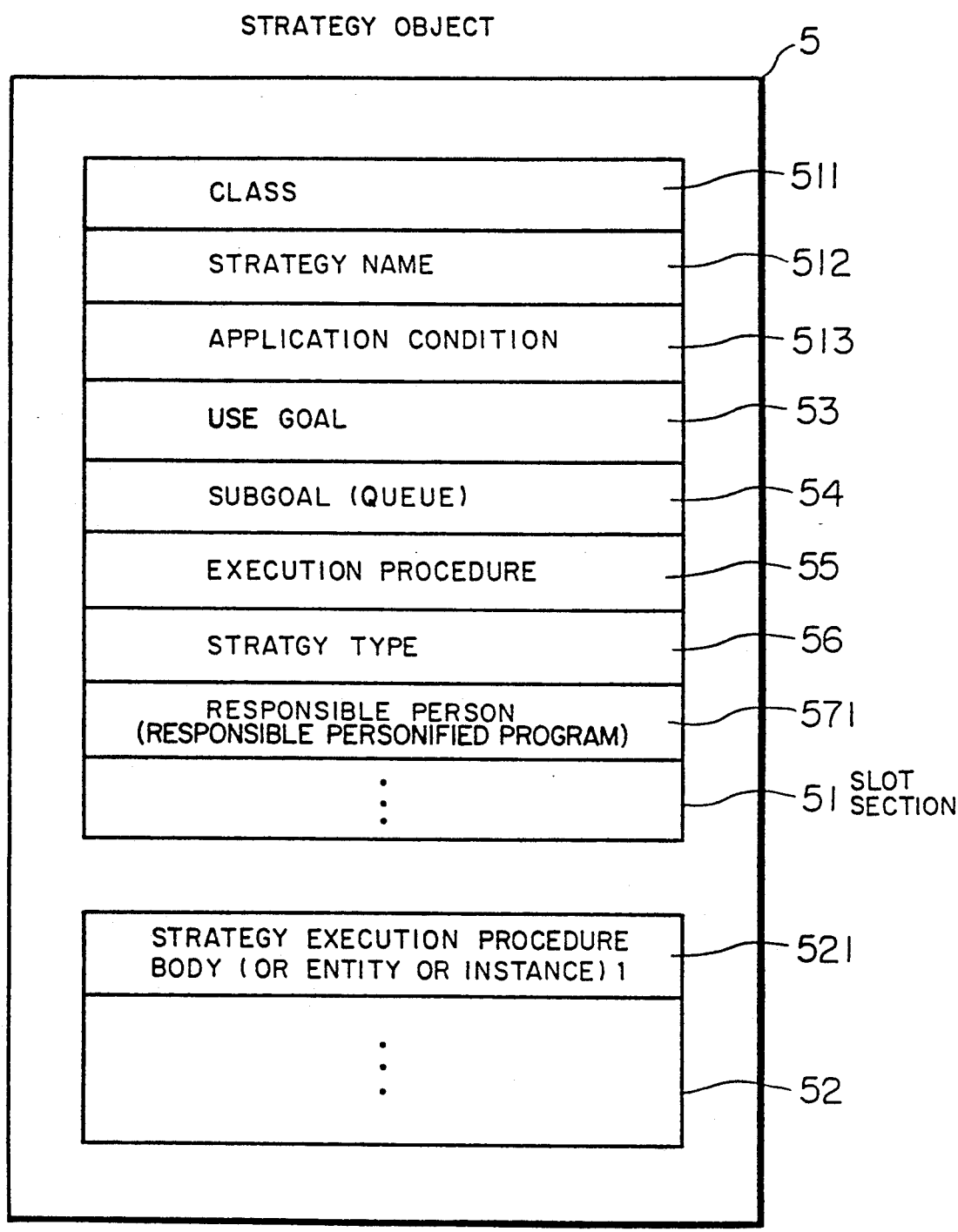
Figure 9D:
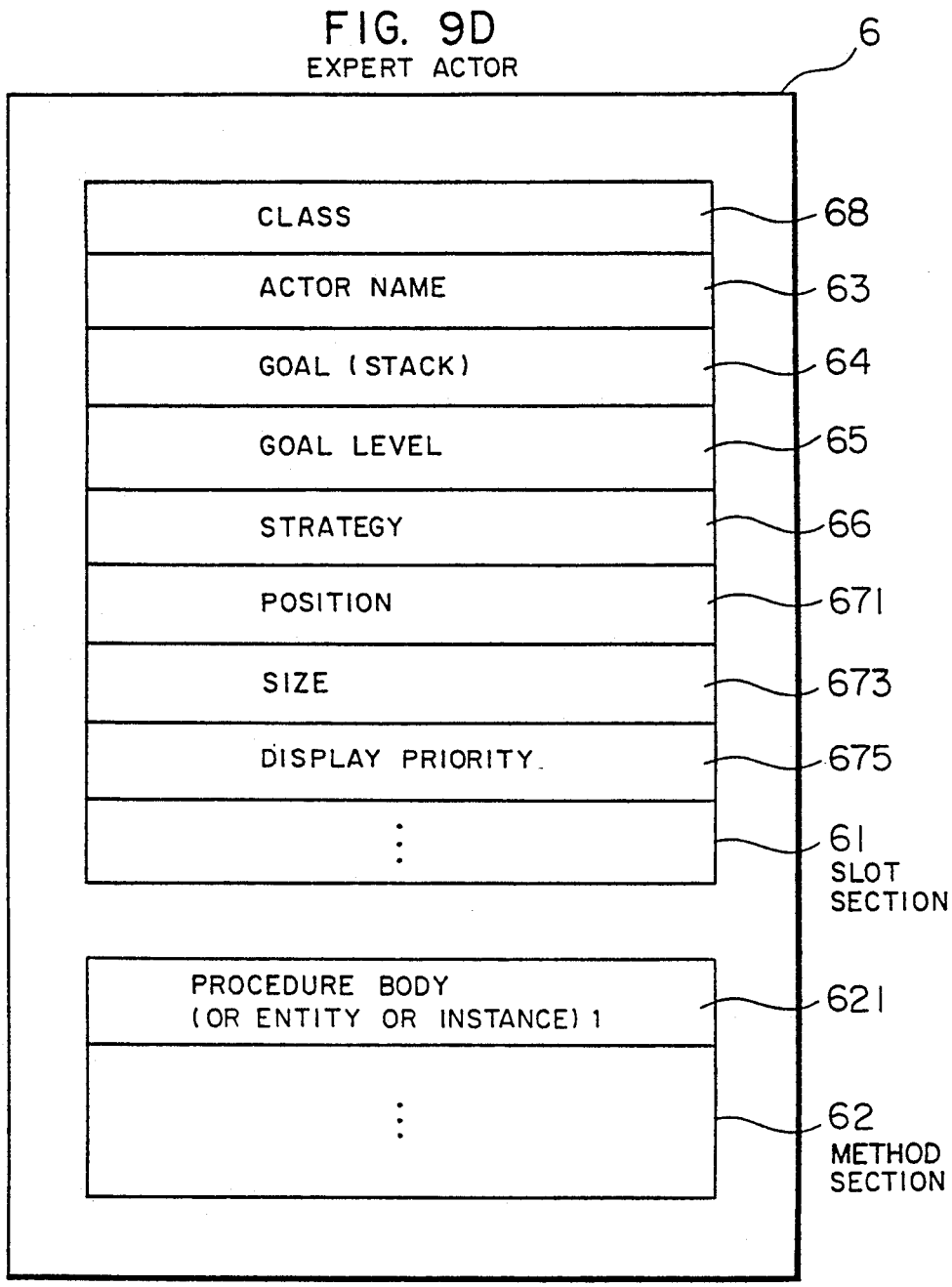
Figure 9E:
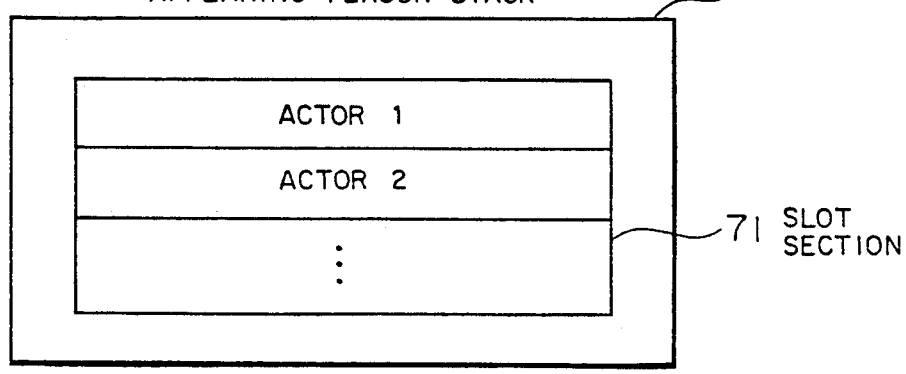

Numeral 6 in FIG. 9D denotes an expert actor, and numeral 61 denotes a slot section of the expert actor 6. The slot section 61 comprises a class 62, an actor name 63, a goal 64, a goal level 65 and a strategy 66. The value of the class 68 is an actor, and the actor name 63 indicates the name for an actor. The goal 64 is a stack of remembering a sequence of goals to be achieved. The goal level 65 remembers a goal level currently processed. The strategy 66 is a stack for remembering strategies selected to attain goals contained in the goal 64. A method section 62 of the expert actor 6 comprises an each method 621 such as a procedure main body (or entity or instance) 1.

Numeral 7 denotes an appearing person stack. The stack 7 is a memory area, whereon actors who have appeared are stacked in the order of appearance and wherefrom actors are popped in the "first-in-last-out" order, namely, beginning form the actor who has appeared last.

Figure 10:
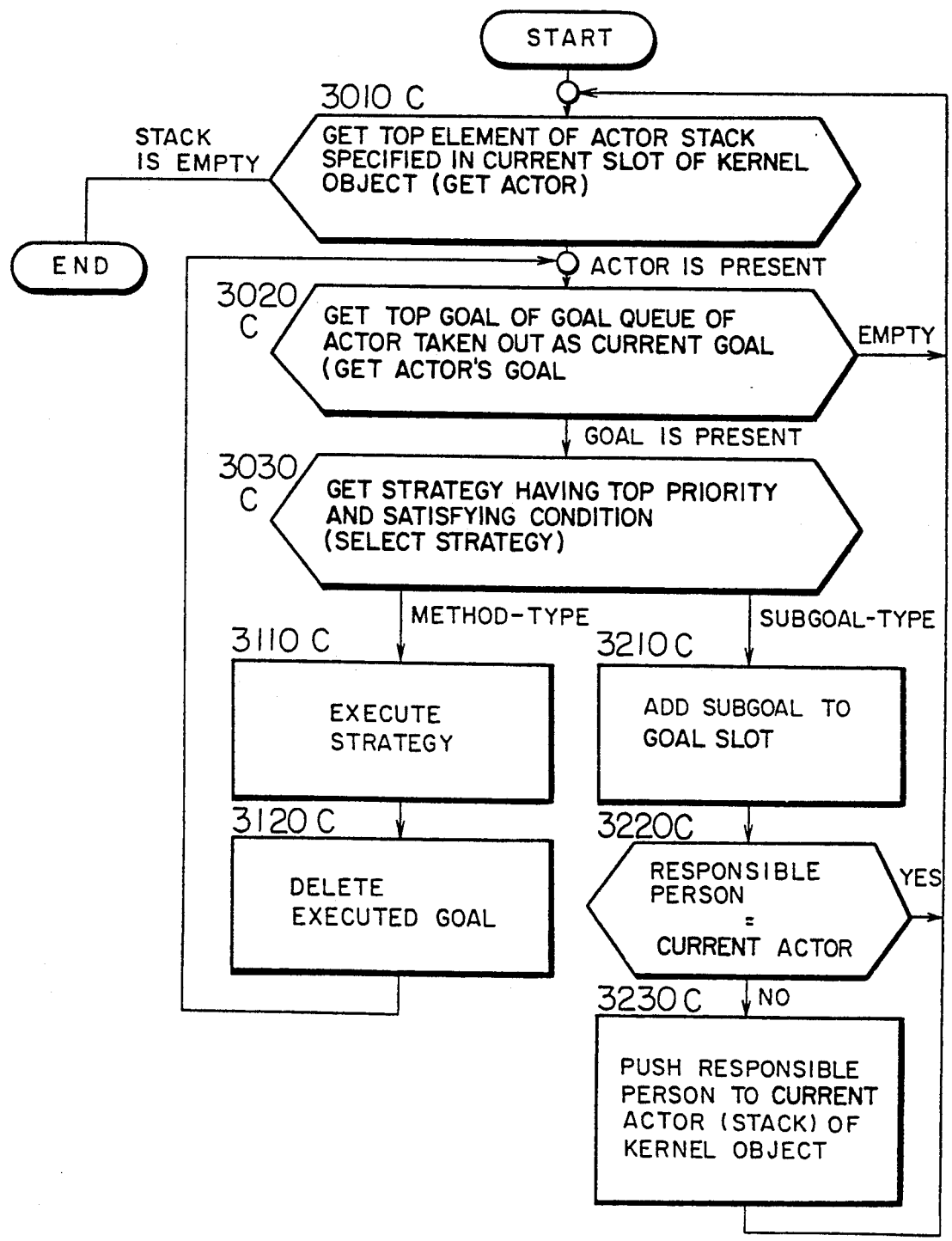

FIG. 10 is a flow chart of a knowledge information processing of the kernel rule section 2.

When the present system is started, the value of the kernel goal 311 of the kernel object 3 is "initialization".

In block 3010C, a person responsible for performing or executing a strategy is fetched. That is to say, a person responsible for performing a strategy is pushed from the current actor slot 315 (stack) of the kernel object 3. If a person responsible for performing a strategy cannot be fetched from the current actor slot 315 (i.e., the appearing person stack 7 is empty), it is regarded that all goals have been performed or executed, resulting in end. (appearance management or performs management)

In block 3020C, a goal of the actor is fetched, through popping, the goal 64 (stack) of the expert actor 6. IF a goal 64 (stack) is empty, the control of the processing returns to the block 3010, and an area (appearing person stack 7) specified by the current actor 315 of the kernel object 3 is popped (i.e., deleted at the top). (disappearance management)

In block 3030C, strategy selection is done. That is to say, if a goal name equivalent to the goal name 412 of the goal object 4 fetched in the block 3020C is present in the applicable goal 53 of the strategy object 5, among such strategy objects, the one highest in the priority which is the value of the applicable use condition 513 is selected and pushed (added) to the strategy 314 of the kernel object and the strategy 66 of the expert actor. Further, the responsible person 571 of the above selected strategy 5 is pushed to the current actor 315 (stack) of the kernel object 3.

In block 3110C, the selected strategy object 5 is executed through invoking execution procedure 55.

In block 3120C, the executed goal is popped from the goal 312 (stack) of the kernel object 3, and the goal 64 (stack) of the expert actor 6 whose name 63 is identical with the current actor 315 is popped.

In block 3210C, if the strategy type 56 of the strategy object 5, whose name 512 is identical with strategy 314, is "subgoal-type", all of the subgoals 54 are substituted for the top element of both the goal 312 of the kernel object 3 and the goal 64 (stack) of the expert actor 6.

In block 3220C, it is checked whether the responsible person 571 of the pertinent strategy object is identical with the top of the current actor 315, namely, the responsible person fetched in the block 3010C.

In block 3230C, the person 571 responsible for the strategy object is pushed to the current actor 315 of the kernel object.

In addition, as for cooperative inference, each expert actor (also referred to as personified model) is capable of displaying its content on a corresponding picture by providing each expert actor 6 with a window attribute. Further, the display position of the personified model, its size and its sequential relation with respect to another personified model or another picture can be automatically or manually altered by changing the slot value of the position 671, the size 673 or the display priority 675 by using program, i.e., another expert actor, various procedures and various rules.

Further, by providing an expert actor (personified model) 6 with an object attribute and starting a procedure main body (such as 621) of the expert actor (personified model) 6 by means of message communication mechanism possessed by the object, (practicability and irrationality of) a request issued from the user or another personified model is checked. (If the request is practicable or a forced request), the request is executed. Further, the answer of result, report or proposal of solution for problem (irrationality) searched by using the above described procedure are also transferred to the request source, the relating expert actor (personified model) and the user by using the message communication mechanism.

When specified data such as the slot value of the object are accessed by the user via a screen or when the slot value and data are directly accessed by the program (such as a personified model), a value before alternation (i.e., a value at the time of access) is compared with a value after alternation (i.e., a value inputted by the user and set in an input buffer or a parameter value set as an argument of the program). The value change is thus sensed and transferred to the relating personified model and object by means of message communication.

One day is divided into periods such as "morning", "morning rush hour" and "night" according to the difference in the number of trains per hour. Partial schedules are generated for respective periods. The partial schedules thus generated are connected together to generate a schedule for one day (tentative train schedule). Subsequently, a trainman schedule for assigning train service time to trainmen is generated from the tentative train schedule. An embodiment of such generation of a train schedule according to the present invention will now be described concretely by taking simplified knowledge configuration of goal, strategy and a person responsible for performing strategy as an example and by referring to FIGS. 10 and 11.

Figure 11:
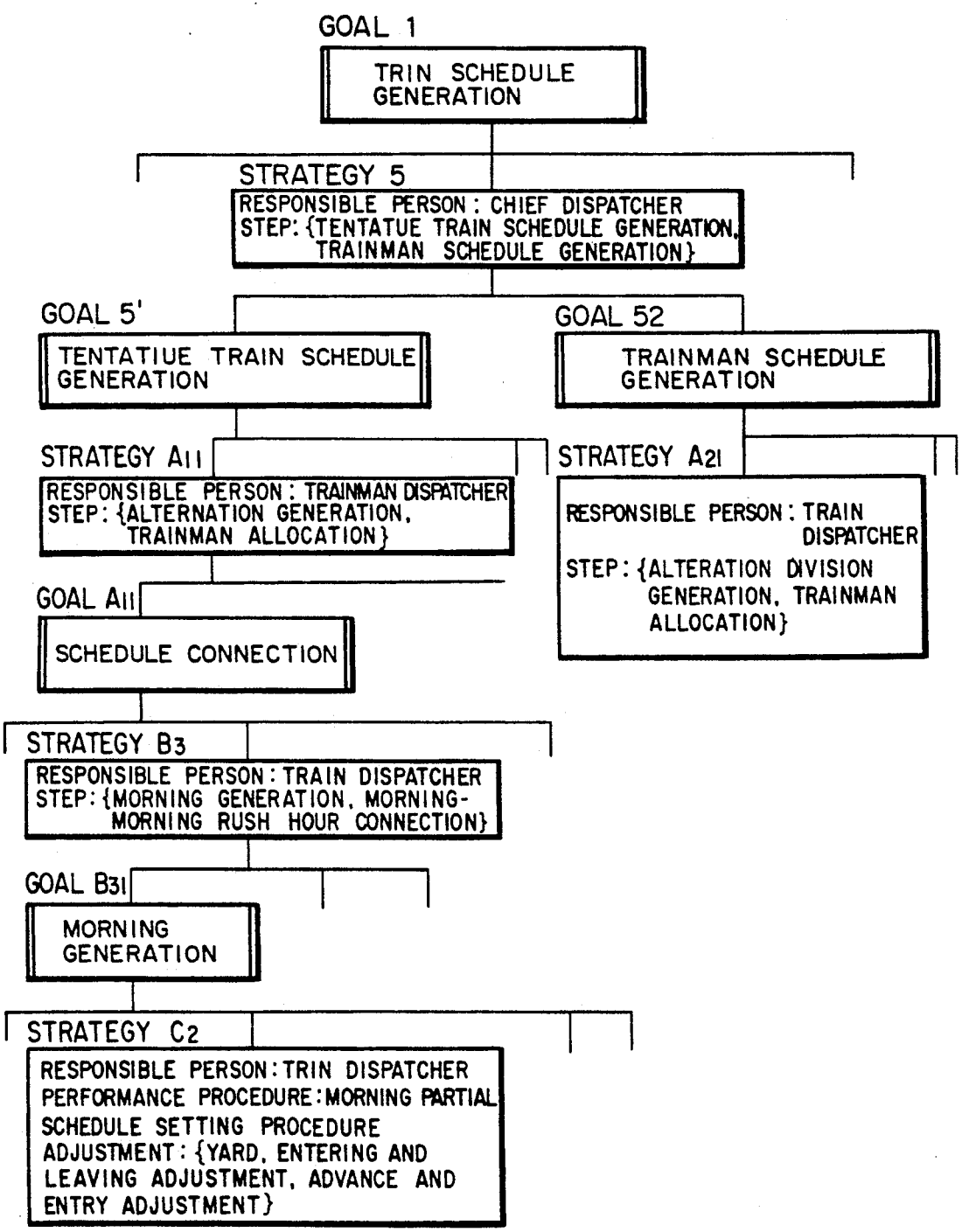

FIG. 11 is a part of simplified description of knowledge hierarchy of goal and strategy (including a responsible person) in generation of a simple train schedule. The goal of the uppermost level is train schedule generation (goal 1). As a method of achieving this, there is considered a strategy 5 in which the responsible person is a chief dispatcher and two subgoals represented as {tentative train schedule generation and trainman schedule generation} are achieved in the order. Subsequently for tentative train schedule generation (goal 51), there is considered a strategy $A_{11}$ in which the responsible person (personified program) is a train dispatcher and subgoals represented as {schedule connection and tentative trains schedule modification} are achieved in this order. Further, strategy $B_3$ and strategy $C_2$ are considered. In trainman schedule generation following tentative trains schedule generation, strategy $A_{21}$ and so on are considered in the same way as the tentative train schedule generation.

Processing flow will now be described by referring to the flowchart of FIG. 10.

It is now assumed that in the block 3010C the chief dispatcher is taken out as the actor (i.e., strategy 5 is selected of the goal of train schedule generation, or the goal 1). It is further assumed that tentative train schedule generation (goal 51) is taken out as the goal in the block 3020C and the strategy $A_{11}$ is taken out in block 3030 to achieve the tentative train schedule generation (goal 51). Since subgoals represented as responsible person: train dispatcher, step: (schedule connection, tentative train schedule modification) exist in the strategy $A_{11}$, subgoals of the strategy $A_{11}$ represented as {schedule connection, tentative trains schedule modification} are added, in the block 3210C, to the goal 312 of the kernel object 3 and the goal 64 of the expert actor 6 having the train dispatcher in the actor name 63. Further, it is checked at the block 3220 whether the value of (the top of) the present actor is equivalent to that of the responsible person slot (responsible personified program) 571 of the strategy $A_{11}$, i.e., whether the present actor indicates the same responsible person as that of the strategy $A_{11}$. Since (the top of) the current actor 315, i.e., the chief dispatcher is different from the train dispatcher responsible for the strategy $A_{11}$, the train dispatcher indicated by the value of the responsible person slot of the strategy $A_{11}$ is added to the current actor 315 of the kernel object in block 3230C.

The present invention is capable of supporting train schedule generation. A train schedule generation support system whereto the present invention has been applied is schematically shown in FIGS. 12 to 16 for reference. Since these reference drawings (FIGS. 12 to 16) are schematized very intelligibly, it is not necessary to explain them.

Figure 12:
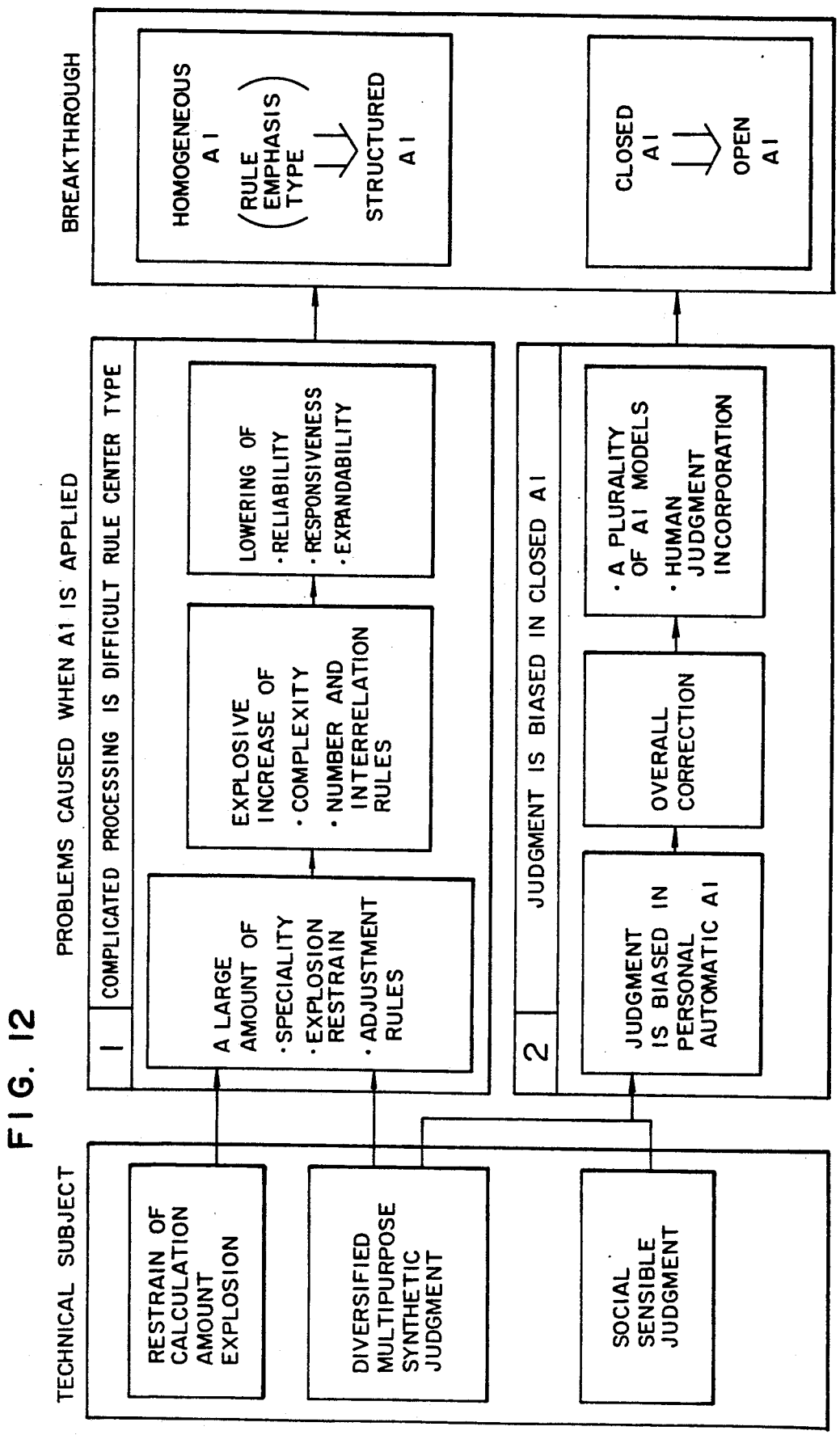
FIG. 12 shows technical subjects of AI (artificial intelligence) in train schedule generation.

FIG. 12 shows technical subject of AI (artificial intelligence) in train schedule generation.

Figure 13:
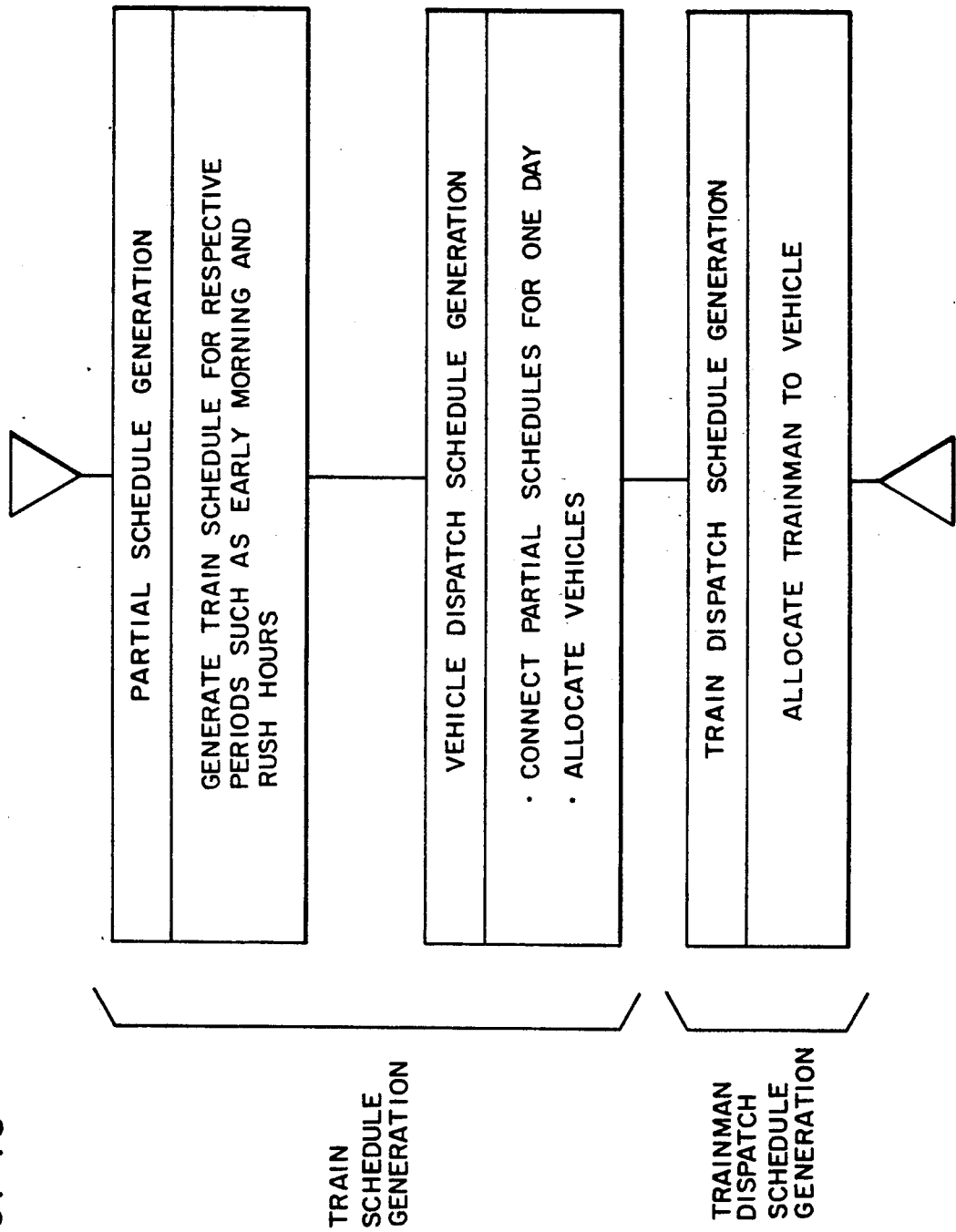
FIG. 13 shows train schedule generation procedures.

FIG. 13 shows an example of train schedule generation means.

Figure 14:
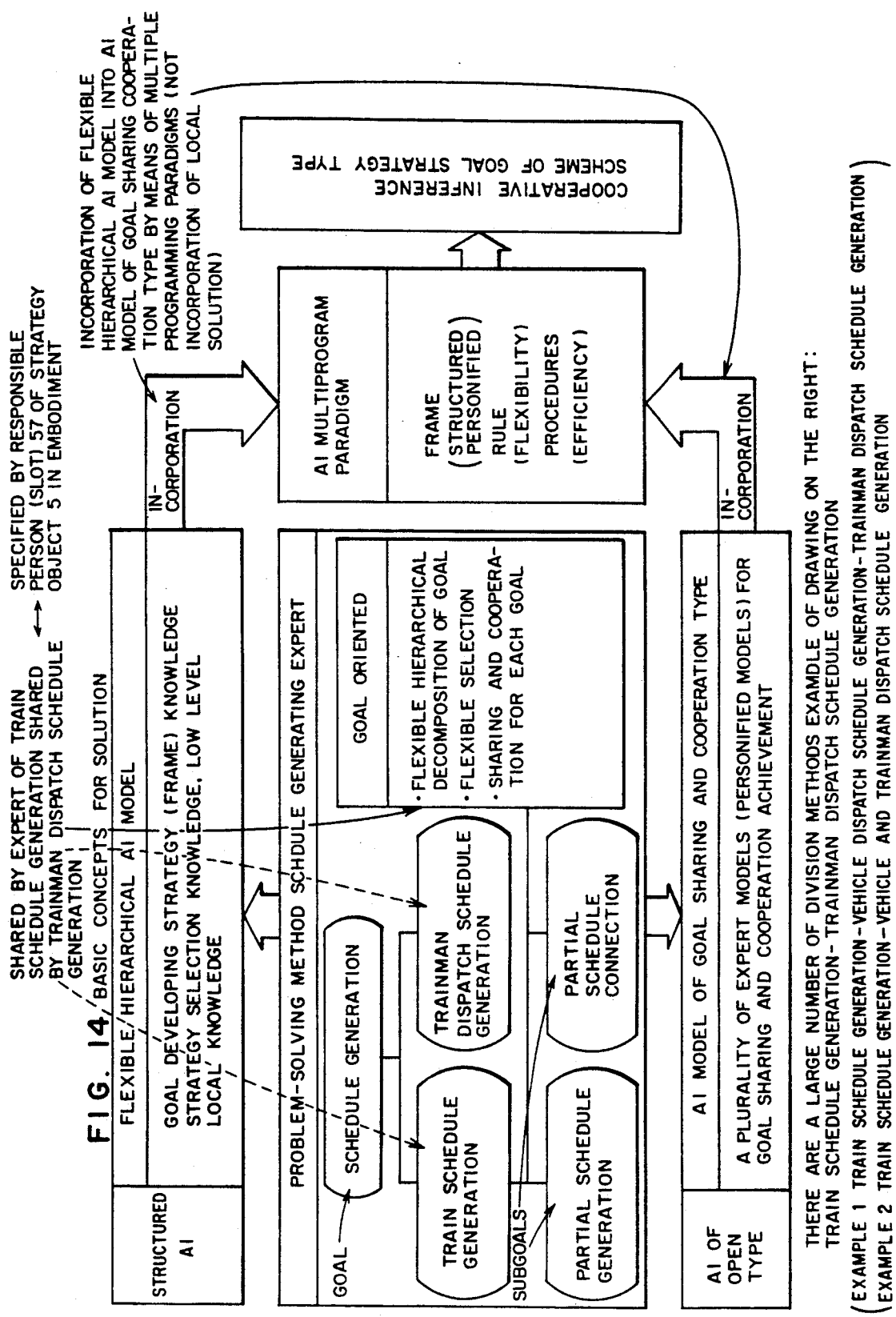
FIG. 14 shows basic concepts for resolving the technical subjects.

FIG. 14 shows basic concepts for solving the technical subjects.

FIG. 15 shows a cooperative inference scheme of goal strategy type which is a scheme of the present claim.

Figure 16:
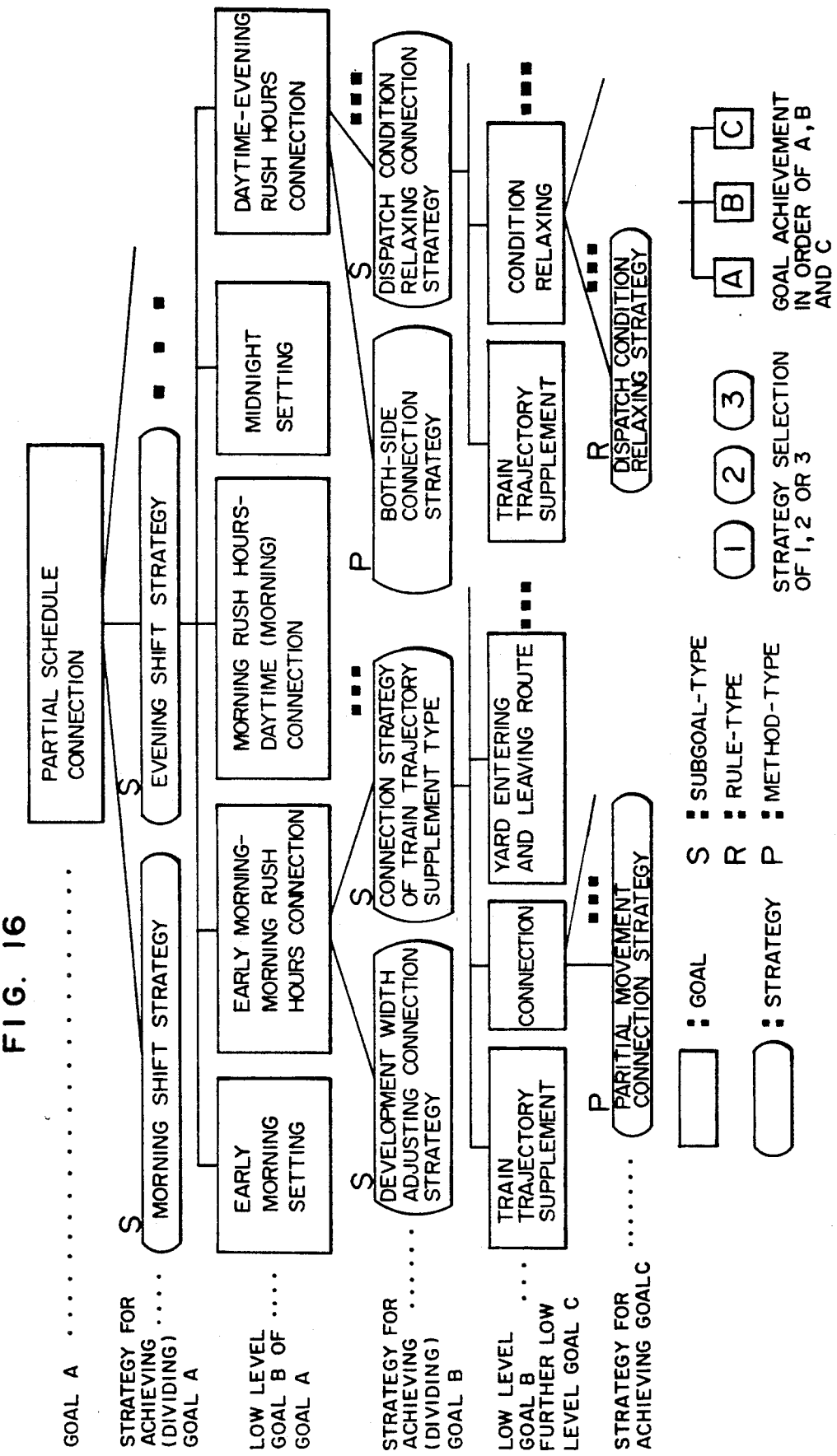
FIG. 16 shows an example of goal strategy net.

FIG. 16 shows an example of goal strategy net which is means for describing a goal with flexible hierarchal decomposition by repeating strategy which is means for defining a goal and means achieving the goal.

Figure 17:
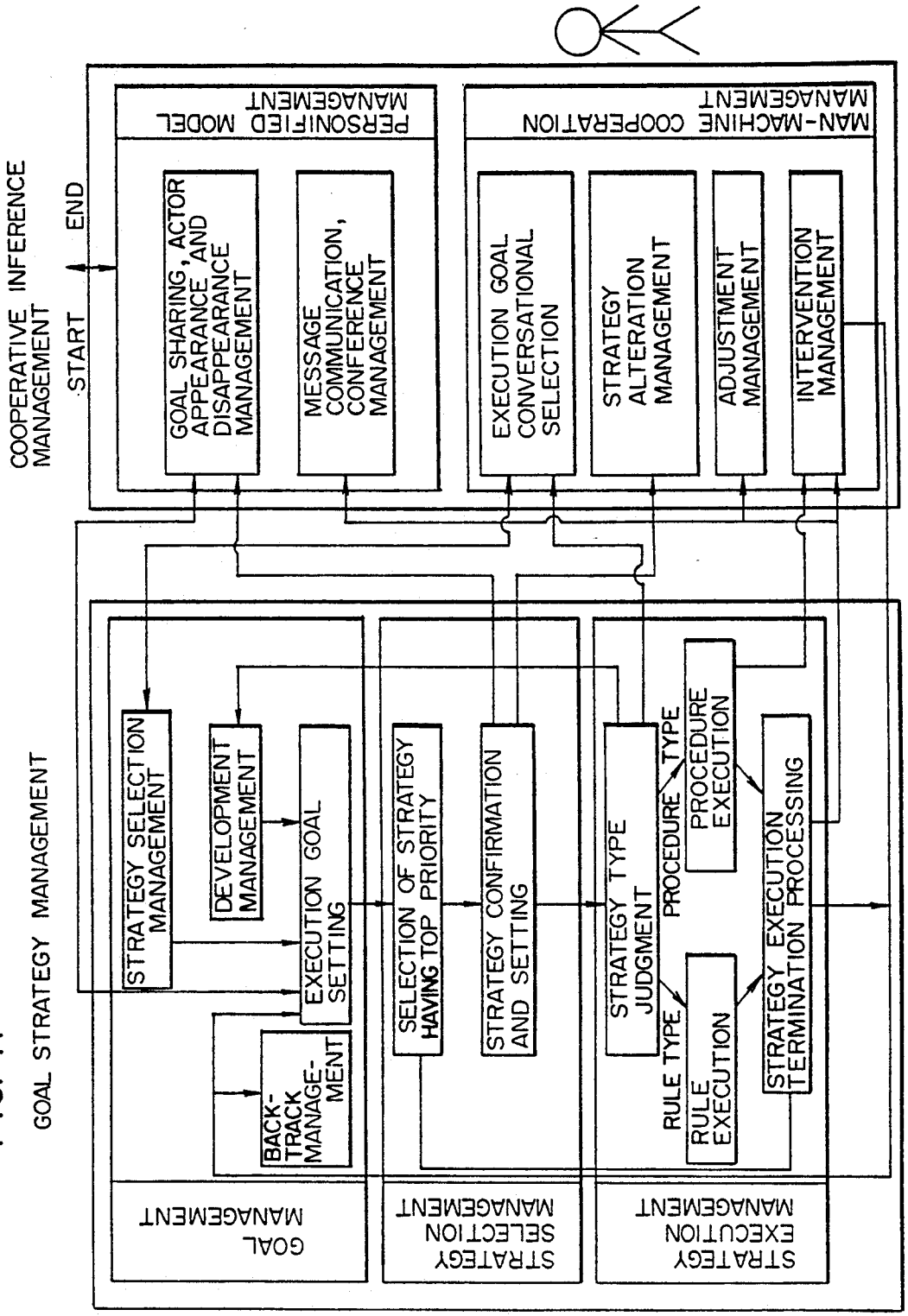
FIG. 17 shows concrete processing blocks of cooperative inference of goal strategy type and processing relation among blocks.

FIG. 17 shows concrete processing blocks of cooperative inference of goal strategy type and processing relation among blocks.

In accordance with the present invention, knowledge peculiar to the field required for problem solving is declaratively described by using goals, strategy hierarchial and objects as performance procedure of strategy. It is then possible to provide kernel software for processing the description and making the inference section solve the problem. As a result, the following effects are obtained.

(1) Unlike the prior art system in which know-how is described by rules, the knowledge can be easily hierarchized and the problems such as mutual entanglement among rules are eliminated, resulting in enhanced reliability of a knowledge-based system. This effect is considered to be significant in a full-scale knowledge-based system having 10 or more rules entangled among each other.

(2) Since knowledge can be described more declaratively than rules, knowledge alteration and addition can be easily performed. Especially in the present inveiton, knowledge relating to the order of achievement of low level goals which becomes important in planning such as train schedule generation and trainman schedule generation can be declaratively described with flexible hierarchy. Therefore, the productivity and reliability in generation of an expert system of plan type can be improved.

(3) Since fixed procedure knowledge can be incorporated efficiently, the efficiency is improved by 50 times or more as compared with a system based upon rules.

(4) Since kernel software can be provided by using rules and objects, its flexibility is high, and function addition can be easily performed.

(5) The cooperative inference scheme of goal strategy type according to the present invention can be easily incorporated into conventional program, and its expert system can be implemented stepwise from a manual system or a conventional system. further, knowledge, and in particular knowledge for making a complicated large-scale plan and knowledge of design type can be easily put in order in a goal-oriented manner. Therefore, the present cooperative inference scheme is a technique useful for generating a train schedule, regulation, making transit plans of bus, airplane and the like, making plans of dispatch of maintenance persons and the like, making plans of business strategy and tactics, and constructing ordinary expert systems of plan type and design type. Therefore, the present cooperative inference scheme is indispensable to advancing mechanical and electrical system products highly and implementing highly intelligent business filed products.

The first embodiment brings about the following effects.

(1) Since adjustment means can be administered separately from basic means for achieving the goal, adjustment means can be freely selected according to the execution result. As compared with the case where conditions are marshalled by suing rules, flexible and rapid adjustment function can be provided.

(2) Since as suitable adjustment method is automatically selected and a desired result is obtained without the necessity of repeating strategy execution, processing time caused by strategy reexecution can be shortened.

(3) Since the strategy execution procedure is administered separately from the adjustment procedure, addition, deletion and modification of the adjustment means can be easily performed, and selection of adjustment means can be performed flexibly.

In the first example of the second embodiment, an inference system of conversational type, in which a inquiry is addressed to the user of the computer system and a goal to be performed subsequently is determined, can also be described by suing objects. The second example of the second embodiment brings about the following effects.

(1) The productivity and reliability can be improved in a plan expert system for performing trainman dispatch or dispatch of vehicle inspectors or workers, which needs cooperative inference performed while applying human judgment, or for performing train schedule generation influenced by a business policy.

(2) Since man-machine interface can be easily altered by only changing the object description, a convenient, flexible conversational-type system can be developed.

The second example of the second embodiment brings about the following effects.

(1) During performance of strategy, the user intervenes in the inference of computer to manually input the user's thought and continues the inference of the computer again or changes the strategy or means of the inference. By thus allowing man-machine cooperative inference. By thus allowing man-machine cooperative inference between computer and human, the system performance, the function reliability and flexibility can be enhanced.

(2) Trouble processing of computer in performing a strategy is indicated to the user to ask for the user's directive, and manual input is allowed. It is thus possible to provide a high-degree man-machine interface for supporting judgment allowing man-machine cooperative inference between computer and human.

Further, the third embodiment brings about the following effect.

(1) Since strategies can be individually administered for every actor whereto strategies belong, strategies belong to different actors do not interfere each other. Further, since the number of strategies to be selected can be minimized at the time of strategy selection according to the kind of the actor, problems of processing speed and lowered reliability can be solved.

We claim:

1. An information processing system including a computer connected to a memory and a display, for processing information, said computer comprising:
   first memory means for storing information representing goals;
   second memory means for storing information representing strategies for attaining said goals,
   (a) each strategy being a data block whose data items explicitly define properties of said strategy in order to structuralize a plurality of various kinds of knowledge for use of said data items, said properties of said strategy including a name of said strategy and a link to an upper level goal for which said strategy is applicable,
   (b) said strategies including a first kind of strategy and a second kind of strategy, both specified by said properties of the strategy,
   (b-1) said first kind of strategy including at least one property for defining a sequence of lower level goals, namely, subgoals of said upper level goal for which said first kind of strategy is applicable,
   (b-2) said second kind of strategy including at least one property for defining a name of a function to directly execute undecomposed lowest level subgoals for which said second kind of strategy is applicable;
   means for processing information to achieve a given goal, based on the information stored in said first and second memory means, by repetitively decomposing said goal into its lower level subgoals until said goal is decomposed into undecomposed lowest level subgoals, interpreting said properties in said first kind of strategy, said properties being a name, a link and a sequence of subgoals, directly executing said undecomposed lowest level subgoals interpreting said properties in said second kind of strategy such as a name of a function where said function is realized by a computer program including rules and outputting or displaying a result of the execution.

2. An information processing system according to claim 1, wherein said second memory means comprises means for storing said strategies as objects each of which comprises data items called slots and data handling procedures, and said data items explicitly define properties for controlling the use of strategies, and said means for processing decomposes, executes and coordinates said goals to solve a problem using said objects.

3. An information processing system according to claim 2, wherein said first memory means comprises means for storing said goals as objects whose data items represent properties for effective or man-machine interactive control such as explanation and interactive modification of goals.

4. An information processing system according to claim 3 wherein said object comprises a package of data.

5. An information processing system according to claim 2, said computer further comprising:
   memory means for storing data representing a property of said strategy specifying a name of an object responsible for achieving said goal or subgoals, cooperatively by exchanging requests among a personified object to let the another personified object invoke procedures specified in its procedure body, by using message passing means of said objects.

6. An information processing system according to claim 5, said computer further comprising:
memory means for storing data representing a property of said strategy for specifying the name of said personified object and for specifying a procedure name of said procedure body in the other personified object.

7. An information processing system according to claim 5, wherein said object is structured data known as a frame which is also hierarchically structured data.

8. An information processing system according to claim 1, said means for processing comprising:
means for selecting or altering said first and second kinds of strategy during execution.

9. An information processing system according to claim 8, said computer further comprising:
(a) memory means for storing data representing a property in a strategy for specifying a strategy use condition and strategy alteration operator, and
(b) memory means for storing data representing rules or procedural programs for strategy selection or alteration wherein, each rule is structured data, comprising a condition part composed of at least one condition item and an action part composed of at least one action item such as a production rule.

10. An information processing system according to claim 8, said computer further comprising:
memory means for storing data representing a property of a strategy for specifying a man-machine interfacing function for selecting or altering said first and second kinds of strategies, and
means for selecting or altering said strategies interactively with a user by use of said man-machine interfacing function.

11. An information processing system according to claim 1, said computer further comprising:
memory means for storing data representing a property of said first kind of strategy for specifying a name of a function for permitting said display to display said subgoals to request a user to select one of said subgoals for execution.

12. An information processing system according to claim 1, said computer further comprising:
memory means for storing data representing a property of said strategy for specifying names of functions for adjusting execution results of said subgoals.

13. An information processing system according to claim 1 said computer further comprising:
memory means for storing a name corresponding to at least a procedure or a rule group and for storing strategy type information for deciding if a procedure or a rule group is said at least one property of said second kind of strategy, and
means for directly executing said undecomposed lowest level subgoals by invoking said procedure or said rule group.

14. An information processing system according to claim 1, said computer further comprising:
memory means for storing data representing a property of said strategy for specifying names of functions for checking and estimating if said goals or subgoals is satisfactory achieved.

15. An information processing system according to claim 1, said computer further comprising:
memory means for storing data representing a property of said strategy, said property specifying a name of a personified program responsible for attaining said goal or said subgoal by said first and second kinds of strategies, and
means for executing the specified responsible personified program to achieve said goal or subgoal.

16. An information processing system according to claim 1 further comprising:
means for checking, during execution of a strategy, for user intervention and for occurrence of a failure in goal execution;
means for, upon occurrence of intervention or a failure, addressing an inquiry to a user and for inputting the user's directive;
means for executing processing in accordance with the directive; and
means for thereafter resuming strategy execution by said information processor.

17. An information processing system according to claim 1, said computer further comprising:
means for checking for user intervention or an occurrence of a failure in goal execution;
means for addressing an inquiry to the user by said display;
means for inquiring of a user and computer interaction; and
means for attaining a goal in a computer in accordance with interaction between a user and said computer.

18. An information processing system according to claims 16 or 11, said computer further comprising:
means for altering a strategy in accordance with a user input which is inputted in response to an inquiry; and
means for returning to a goal already executed and advancing to a next goal.

19. An information processing system according to claim 18, said computer further comprising:
means for monitoring a change in a slot value of an actor; and
means for automatically performing processing corresponding to the change.

20. An information processing system according to claim 16, said computer further comprising:
means for monitoring a change in a slot value of an actor; and
means for automatically performing processing corresponding to the change.

21. An information processing system according to claim 20, wherein said rule is represented as a computer program including conditional statements.

22. An information processing system according to claim 21, wherein said rule is represented as a computer program including conditional statements.

23. An information processing system according to claim 16, wherein said rule is represented as a computer program including conditional statements.

24. An information processing system including a computer connected to a memory and a display, for processing information, said computer comprising:
first memory means for storing information representing goals;
second memory means for storing information representing strategies for attaining said goals,
(a) each strategy being a data block whose data items explicitly define properties of a strategy in order to structuralize a plurality of various kinds of knowledge for use of said knowledge, said properties of said strategy including a name of said strategy and a link to an upper level goal for which said strategy is applicable, (b) said strategies including a first kind of strategy and a second kind of strategy, both specified by said properties of a corresponding strategy, (b-1) said first kind of strategy including at least one property for defining a sequence of lower level goals, namely, subgoals of said upper level goal for which said first kind of strategy is applicable, (b-2) said second kind of strategy including at least one property for defining a name of a function to directly execute undecomposed lowest level subgoals for which said second kind of strategy is applicable; and third memory means called a goal-stack for storing goals including subgoals to be achieved;

procedure means for fetching goals including subgoals;

means for pushing goals including subgoals; and means for processing information to achieve a given goal by fetching said information representing a goal, selecting information representing a strategy whose property representing a link to an upper level goal indicates said fetched information, repetitively decomposing said goal into its lower level subgoals until said goal is decomposed into undecomposed lowest level subgoals, pushing said sequence of subgoals defined as said properties of said first kind of strategy above selected, and directly executing said undecomposed lowest level subgoals and outputting or displaying the result, through invoking a function represented as said property of said second kind of strategy, where said function is realized by a computer program including rules.

25. An information processing system according to claim 24, wherein said first memory comprises means for storing said goals in said goal-stack including a fetching and pushing procedure as objects each of which comprises data items called slots and data handling procedures, and said data items explicitly define properties for controlling the use of strategies, and said computer comprises means for decomposing executing and coordinating goals to solve a problem, using said objects.

26. An information processing system according to claim 25, wherein said memory comprises means for storing said goals as objects whose data items represent properties for effective or man-machine interactive control such as explanation and interactive modification of goals.

27. An information processing system including a computer connected to a memory and a display, for processing information said computer comprising:

first memory means for storing a first kind of data blocks called goals;

second memory means for storing a second kind of data blocks called strategies;

(a) each of said second kind of data blocks, including data for identifying said second kind of data including a name of said second kind of data block and data pointing to at least one of said first kind of data blocks, said second kind of data block being called applicable goal representing an upper level goal to which this strategy, is applicable, (b) said second kind of data blocks further including two types of data blocks, one of which being called a first type of strategy and the other being called a second type of strategy, (b-1) said first type of said second kind of data block further including date which points to a sequence of each of a first kind of data blocks, said sequence being called a sequences of subgoals, or lower level goals, (b-2) the second type of said second kind of data blocks further including data which indicates a function including a program module directly executable by said computer; and means for processing said data blocks, including:

(a) third memory means for storing, as a stack, the sequence of pointers, of some of said first kind of data blocks, said third memory means being called a goal stack for storing goals including subgoals to be achieved, each of said sequence of pointers representing a goal including a subgoal which should be achieved, (b) means for fetching, including popping and setting or getting, a pointer at the top of said goal stack, said means for fetching being called a goal manager, (c) means for selecting one of a second hind of data blocks whose data called an applicable goal is equal in value to said pointer fetched by said goal manager, said means for selecting being called a strategy selector, (d) means for pushing, in said stack, said sequence of pointers to each data block of a first kind which is pointed to by data of said data block of said second kind selected by said strategy selector, if the first type of data block is selected, said means for pushing being called decomposition manager, (e) means for invoking a function pointed to by data of said data block of second kind selected by said strategy selector, if the second type of selected data block is selected, and outputting or displaying the result, said means for invoking being called goal executer.

* * * * *